US012574317B2

(12) United States Patent
Ahmed et al.

(10) Patent No.:    US 12,574,317 B2
(45) Date of Patent:        Mar. 10, 2026

(54) PROACTIVE ROUTING OF APPLICATION TRAFFIC IN SOFTWARE DEFINED WIDE AREA NETWORKS

(71) Applicant: Cisco Technology, Inc., San Jose, CA (US)

(72) Inventors: Syed Arslan Ahmed, Bengaluru (IN); Amjad Inamdar, Bengaluru (IN); Ankur Bhargava, Pleasanton, CA (US); Raj Venkatesan, Mill Valley, CA (US); Ashish Sood, Cupertino, CA (US); Aleksandar Miodrag Ivanovic, Santa Clara, CA (US)

(73) Assignee: Cisco Technology, Inc., San Jose, CA (US)

(*) Notice:    Subject to any disclaimer, the term of this patent is extended or adjusted under 35 U.S.C. 154(b) by 72 days.

(21) Appl. No.: 18/637,223

(22) Filed:    Apr. 16, 2024

(65)            Prior Publication Data

US 2025/0323863 A1    Oct. 16, 2025

(51) Int. Cl.
    *G06F 15/16*        (2006.01)
    *H04L 45/302*       (2022.01)
    *H04L 47/2425*      (2022.01)
(52) U.S. Cl.
    CPC ........ *H04L 45/302* (2013.01); *H04L 47/2425* (2013.01)
(58) Field of Classification Search
    CPC .......................... H04L 45/302; H04L 47/2425
    See application file for complete search history.

(56)            References Cited

U.S. PATENT DOCUMENTS

| | | | | |
|---|---|---|---|---|
| 10,491,528 B2 * | 11/2019 | Zhang | ..................... | H04L 43/55 |
| 11,223,538 B1 | 1/2022 | Arumugam et al. | | |
| 11,398,958 B2 * | 7/2022 | Vasseur | ................. | H04L 45/302 |
| 2006/0171315 A1 * | 8/2006 | Choi | ........................ | H04L 47/20 |
| | | | | 370/395.2 |
| 2009/0296700 A1 * | 12/2009 | Stevens | ................. | H04L 45/308 |
| | | | | 370/389 |

(Continued)

OTHER PUBLICATIONS

De Sensi, et al., "Mitigating Network Noise on Dragonfly Networks through Application-Aware Routing", arxiv.org, Cornell University Library, Sep. 17, 2019, pp. 1-14.

(Continued)

*Primary Examiner* — Razu A Miah
(74) *Attorney, Agent, or Firm* — Lee & Hayes, P.C.

(57)            ABSTRACT

Techniques and mechanisms for intelligently and proactively routing application traffic within a SD-WAN. The techniques may utilize application models to determine bandwidth utilization and usage patterns of application flow(s), determine and predict the impact of potential movement or addition of the application traffic to a pathway and the SLA requirements of the pathway, and intelligently route and/or re-route the packets through the most optimal path, thereby preventing and/or minimizing policy violations. Techniques and mechanisms for intelligently analyze a target network and determine the impact of adding that application on the network based on usage patterns, flow density, bandwidth requirements and volume of traffic, thereby streamlining the process of designing a new network or adding an application to an existing network.

20 Claims, 9 Drawing Sheets

(56) References Cited

U.S. PATENT DOCUMENTS

| | | | | |
|---|---|---|---|---|
| 2013/0159479 A1* | 6/2013 | Vasseur | ................. | H04L 49/205 |
| | | | | 709/221 |
| 2015/0195149 A1* | 7/2015 | Vasseur | .............. | H04L 47/2425 |
| | | | | 370/252 |
| 2015/0332155 A1* | 11/2015 | Mermoud | ............. | G06N 5/048 |
| | | | | 706/12 |
| 2019/0319872 A1 | 10/2019 | Adhikari et al. | | |
| 2020/0296011 A1* | 9/2020 | Jain | ......................... | H04L 43/20 |
| 2020/0379839 A1* | 12/2020 | Savalle | .............. | H04L 12/4633 |
| 2020/0382414 A1 | 12/2020 | Vasseur et al. | | |
| 2020/0389390 A1* | 12/2020 | Vasseur | ................. | G06N 20/00 |
| 2021/0367892 A1* | 11/2021 | Young | .................. | H04L 47/627 |
| 2022/0070086 A1* | 3/2022 | Mermoud | .............. | H04L 41/40 |
| 2022/0224607 A1* | 7/2022 | Kumar | ............... | H04L 41/5045 |
| 2022/0231939 A1 | 7/2022 | Mermoud et al. | | |
| 2022/0414450 A1* | 12/2022 | Guo | ..................... | G08G 1/0141 |
| 2023/0008106 A1 | 1/2023 | Vasseur et al. | | |
| 2023/0019788 A1* | 1/2023 | Bajaj | .................. | H04L 47/2441 |
| 2023/0059537 A1 | 2/2023 | Gavand et al. | | |
| 2023/0080537 A1* | 3/2023 | Ramanathan | ....... | H04L 47/2475 |
| | | | | 709/238 |
| 2023/0171190 A1* | 6/2023 | Vasseur | ................... | H04L 45/70 |
| | | | | 370/389 |
| 2023/0216784 A1 | 7/2023 | Ramanathan et al. | | |
| 2023/0308359 A1 | 9/2023 | Vasseur et al. | | |
| 2024/0007392 A1 | 1/2024 | Vasseur et al. | | |

OTHER PUBLICATIONS

Search Report and Written Opinion for International Application No. PCT/US25/24916, Dated Jul. 1, 2025, 17 pages.
Search Report and Written Opinion for International Application No. PCT/US25/25945, Dated Jul. 14, 2025, 16 pages.
Zhang, et al., "Quantifying the Impact of network congestion on application performance and network metrics", 2020 IEEE International Conference on Customer Computing, Sep. 14, 2020, pp. 162-168.

* cited by examiner

APPLICATION(S) 110N

BRANCHE(S) 106

104N

APPLICATION 124

118

120

ADMINISTRATOR DEVICE(S) 122

POLICY(IES) AND APPLICATION MODEL(S) 120

NETWORK(S) 102

TELEMETRY DATA 118

CONTROLLER 112

MANAGEMENT MODULE 114

ANALYTICS MODULE 116

118

EDGE DEVICE(S) 104A

120

APPLICATION(S) 110A

SITE(S) 108

100A

1   RECEIVE TELEMETRY DATA

2   GENERATE POLICY(IES) AND APPLICATION MODEL(S)

3   PUSH POLICY(IES) AND APPLICATION MODEL(S) TO EDGE DEVICE(S)

4   ENFORCE POLICY(IES) WHEN ROUTING APPLICATION FLOW(S) USING APPLICATION MODEL(S)

FIG. 1A

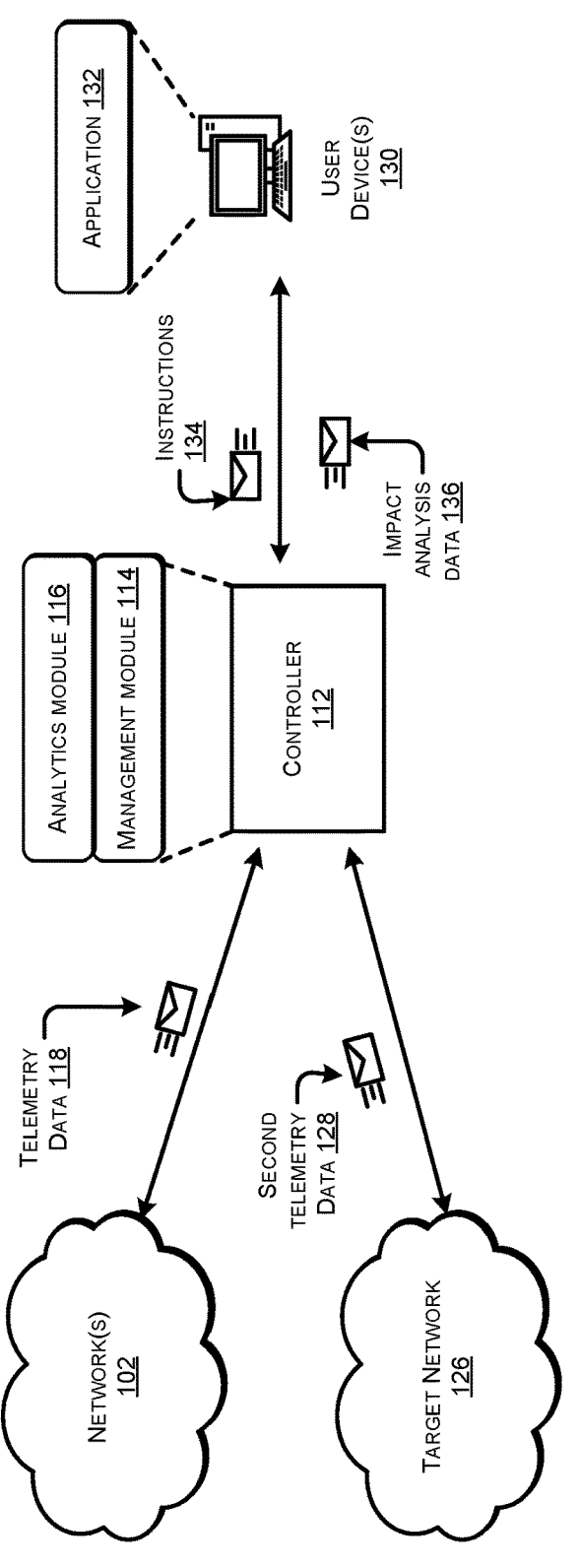
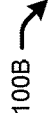
100B
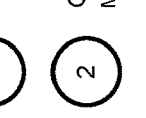
① RECEIVE TELEMETRY DATA FOR NETWORK(S) OF TENANT(S)
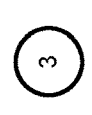
② GENERATE MODEL(S) OF APPLICATION(S) BASED ON CROSS-TENANT METRIC(S)
③ RECEIVE SECOND TELEMETRY DATA FROM A TARGET NETWORK
④ GENERATE AND OUTPUT IMPACT ANALYSIS FOR ADDING APPLICATION(S) TO THE TARGET NETWORK
FIG. 1B

200

| | |
|---|---|
| PROCESSOR(S) 202 | NETWORK INTERFACE(S) 204 |

MEMORY 206

| | |
|---|---|
| NETWORK SERVICE FUNCTIONS 208 | NETWORK ORCHESTRATION FUNCTIONS 210 |
| SERVICE MANAGEMENT FUNCTIONS 212 | APPLICATION PROGRAMMING INTERFACES (APIs) 214 |
| MANAGEMENT MODULE 114 | ANALYTICS MODULE 116 |

DATA STORE 216

| COMMUNICATION LIBRARIES 218 | NETWORK TOPOLOGY 220 | POLICIES 222 | DATA AND MODEL(S) 224 |
|---|---|---|---|

CONTROLLER 112

300

APPLICATION MODEL(S) 302

MANAGEMENT MODULE 114

ANALYTICS MODULE 116

POLICY(IES) AND APPLICATION MODEL(S) 120

TELEMETRY DATA 118

LINK 1 306A

LINK 2 306B

LINK 3 306N

EDGE DEVICE 104

EDGE DEVICE(S) 308

APPLICATION FLOW 1 304A

APPLICATION FLOW 2 304B

APPLICATION(S) 110

400

USER DEVICE(S)
130

INSTRUCTION(S) 134

IMPACT ANALYSIS DATA 136

MANAGEMENT MODULE
114

ANALYTICS MODULE
116

POLICY(IES)
120

FIRST DATA
402

SECOND DATA 404

EDGE DEVICE(S) 104

TARGET NETWORK 126

500

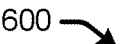

600

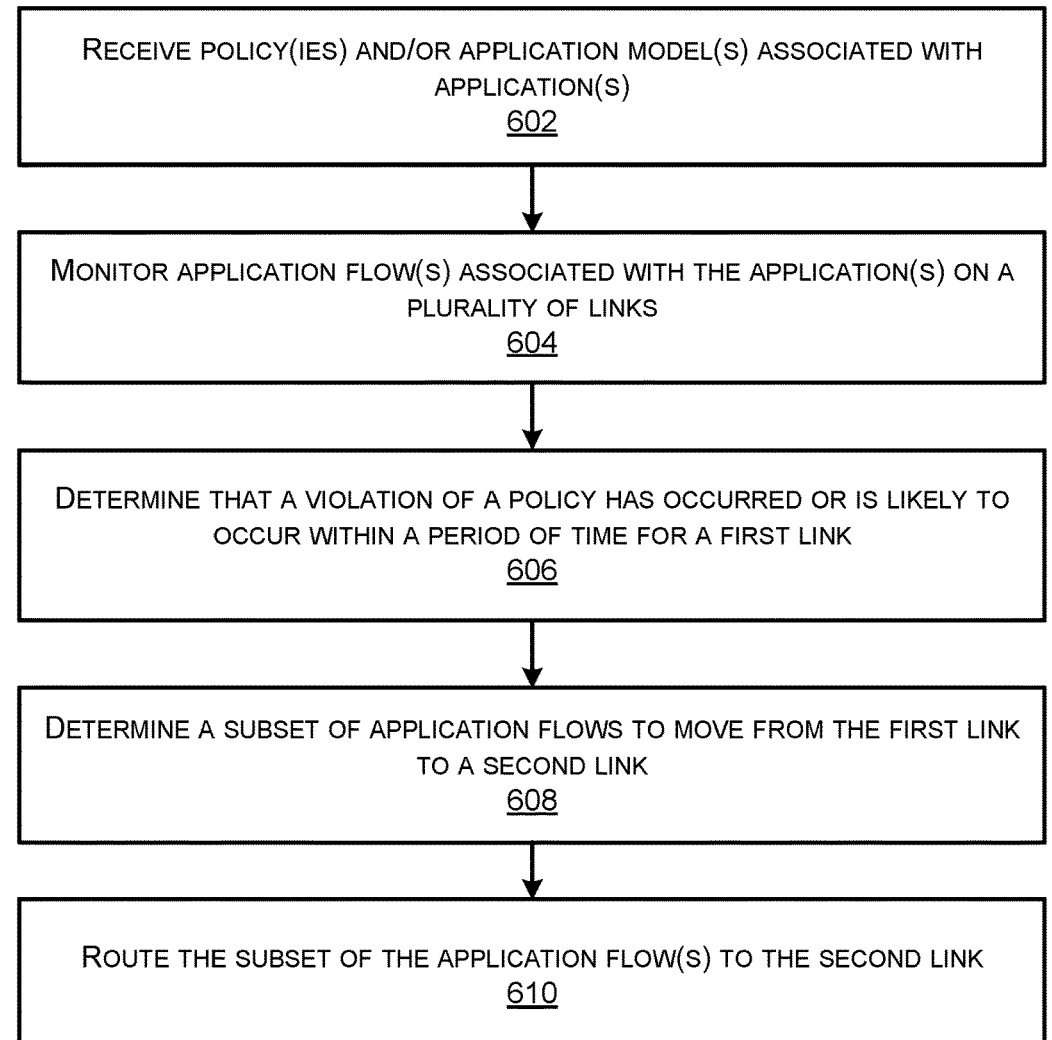

RECEIVE POLICY(IES) AND/OR APPLICATION MODEL(S) ASSOCIATED WITH
APPLICATION(S)
602

MONITOR APPLICATION FLOW(S) ASSOCIATED WITH THE APPLICATION(S) ON A
PLURALITY OF LINKS
604

DETERMINE THAT A VIOLATION OF A POLICY HAS OCCURRED OR IS LIKELY TO
OCCUR WITHIN A PERIOD OF TIME FOR A FIRST LINK
606

DETERMINE A SUBSET OF APPLICATION FLOWS TO MOVE FROM THE FIRST LINK
TO A SECOND LINK
608

ROUTE THE SUBSET OF THE APPLICATION FLOW(S) TO THE SECOND LINK
610

FIG. 6

700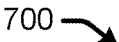

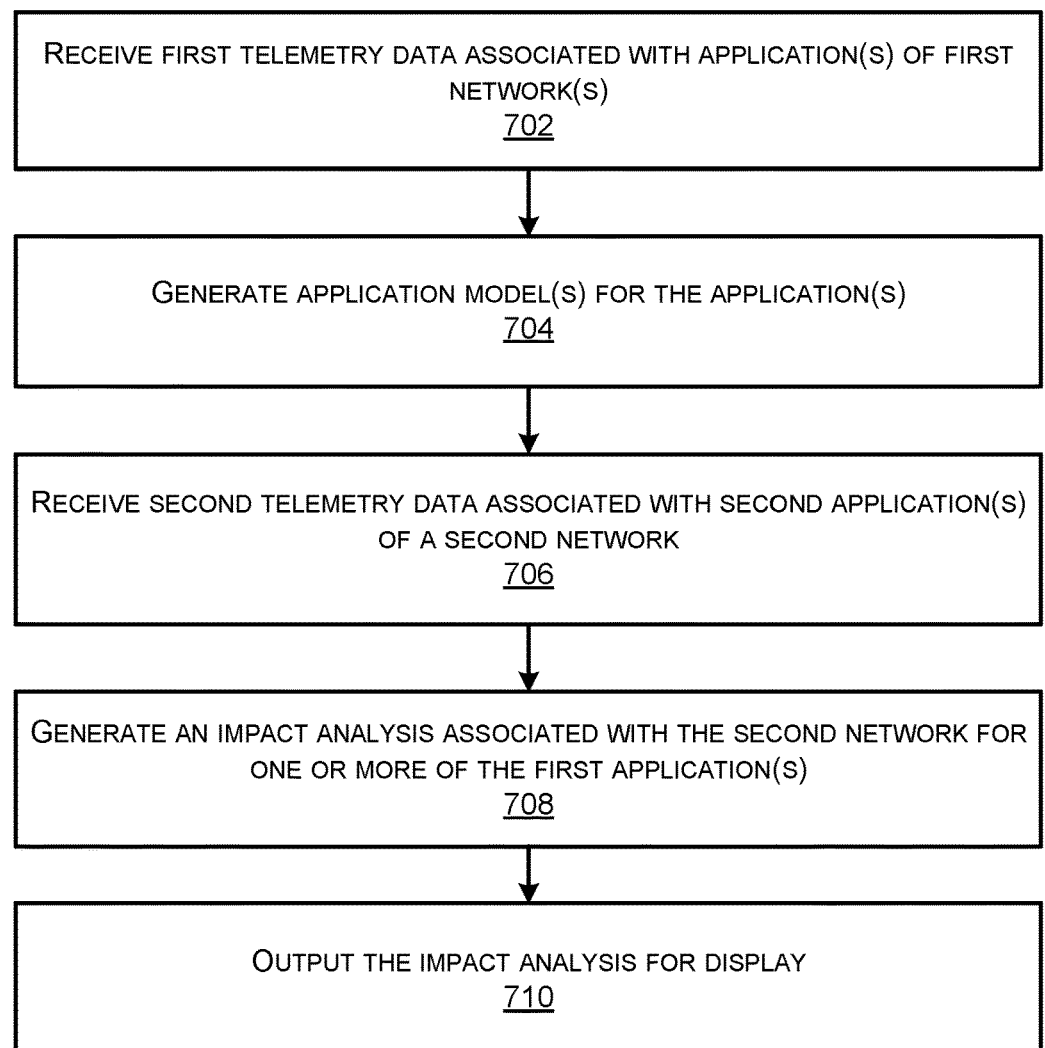

RECEIVE FIRST TELEMETRY DATA ASSOCIATED WITH APPLICATION(S) OF FIRST NETWORK(S)
702

GENERATE APPLICATION MODEL(S) FOR THE APPLICATION(S)
704

RECEIVE SECOND TELEMETRY DATA ASSOCIATED WITH SECOND APPLICATION(S) OF A SECOND NETWORK
706

GENERATE AN IMPACT ANALYSIS ASSOCIATED WITH THE SECOND NETWORK FOR ONE OR MORE OF THE FIRST APPLICATION(S)
708

OUTPUT THE IMPACT ANALYSIS FOR DISPLAY
710

FIG. 7

PROACTIVE ROUTING OF APPLICATION TRAFFIC IN SOFTWARE DEFINED WIDE AREA NETWORKS

TECHNICAL FIELD

The present disclosure relates generally to the field of computer networking, and more particularly to proactively routing application traffic based on modeled impact of application flows on pathway Service Level Agreements (SLAs). The present disclosure also relates to intelligently determining an impact of introducing an application to a new or existing SD-WAN network.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

One example network is an enterprise network that utilizes a software defined wide area network (SD-WAN). In SD-WANs, application aware routing techniques route application traffic flows over paths that meet the application SLA requirements and move the flows from one path to another when a path SLA violation occurs. For examples, when a path SLA violation occurs due to routing or re-routing of application flows through a path, current techniques take a significant amount of time (e.g., of minutes) to detect the violation. During this detection period, the SLA and the application experience of the flows on this path is impacted, resulting in poor user experience.

Accordingly, there is a need for an intelligent and proactive way to route application flows, while minimizing SLA pathway violations.

Additionally, when designing a SD-WAN network, the topology, allocated capacity per site per link, the QoS policies, AAR (Application Aware Routing) policies may be defined to optimize network operation and cost and ensure that the users are able to access the network and applications with a good quality of experience. At the outset, the network is usually designed by making approximations on the connectivity and throughput requirements at a site and ensuring they are fairly distributed amongst the applications and users for optimal performance and experience.

However, when planning capacity requirements for an enterprise SD-WAN network, a network administrator may not consider the impact or future repercussions of adding another application into the network at a later state without extensive testing. When an addition of an application does occur, a network administrator may make assumptions about the usage of the application, its chattiness, its impact on the quality of the links or the effect of the application on the overall network and the existing applications. Thus, migration of applications in existing deployments may be slow and may introduce problems that an administrator may not be aware of or account for during planning.

Accordingly, there is a need for an intelligent way to determine the impact of adding a new application to a new SD-WAN and/or an existing network and the impact the new application on existing applications and their quality of experience.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1A illustrates a system-architecture diagram of an environment in which a system can proactively route application traffic based on modeled impact of application flows on pathway service level agreement requirements.

FIG. 1B illustrates a system-architecture diagram of an environment in which a system can intelligently determine the impact of introducing an application to a target SD-WAN.

FIG. 6 illustrates a flow diagram of an example system for proactively routing application traffic to minimize SLA violations within a network associated with the system described in FIGS. 1-5.

FIG. 7 illustrates a flow diagram of an example method for intelligently determining the impact of introducing an application to a target network associated with the system described in FIGS. 1-6.

DESCRIPTION OF EXAMPLE EMBODIMENTS

Overview

Figure 2:
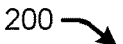
FIG. 2 illustrates a component diagram of an example controller, as described in FIGS. 1A and 1B.

The present disclosure relates generally to the field of computer networking, and more particularly to proactively routing application traffic based on modeled impact of application flows on pathway Service Level Agreements (SLAs). The present disclosure also relates to intelligently determining an impact of introducing an application to a new or existing SD-WAN network.

A method to perform the techniques described herein may include receiving one or more application models associated with one or more applications and one or more policies associated with the network. The method may include monitoring, based on the one or more policies and the one or more application models, application flows associated with the one or more applications on one or more links. The method may also include determining, based at least in part on the monitoring and the application models, that a violation of a policy of the one or more policies on a first link of the one or more links has either (i) occurred or (ii) is likely to occur within a period of time. The method may include determining, based at least in part on the application model and the monitoring, a subset of the application flows to move from the first link to a second link. The method may also include routing the subset of the application flows from the first link to the second link.

Another method to perform the techniques described herein may include receiving an application model associated with an application and one or more policies. The method may include monitoring, within the network, a first set of application flows associated with the application on a first link. Additionally, the method may include identifying, a second set of application flows associated with the application. The method may also include determining, based at least in part on the application model and the monitoring, an impact of each application flow of the second set of applications flows on the first link and a plurality of other links. The method may include routing, based at least in part on determining the impact, a first portion of the second set of application flows to the first link and a second portion of the second set of application flows to a second link of the plurality of other links.

An additional method to perform the techniques described herein for intelligently determining an impact introducing an application will have on an existing and/or newly designed SD-WAN. The method may include receiving, from first networks associated with a plurality of tenants, first telemetry data associated with the first networks and a plurality of first applications. The method may include generating, based at least in part on the first telemetry data, an application model for an application of the plurality of first applications. The method may also include receiving, from a second network associated with an enterprise user, second telemetry data associated with the second network and a plurality of second applications. The method may further include generating, based at least in part on the application model and the second telemetry data, an impact analysis associated with the second network. Additionally, the method may include outputting the impact analysis to a user device for display.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

EXAMPLE EMBODIMENTS

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet service provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

One example network is an enterprise network that utilizes a software defined wide area network (SD-WAN). In SD-WANs, application aware routing techniques are used as a way to try and optimize application traffic routing. Application aware routing techniques may route application traffic flows over paths that meet the application SLA requirements and move the flows from one path to another when a path SLA violation occurs. For examples, when a path SLA violation occurs due to routing or re-routing of application flows through a path, current techniques take a significant amount of time (e.g., of minutes) to detect the violation. During this detection period, the SLA and the application experience of the flows on this path is impacted, resulting in poor user experience.

Further, when the path SLA violation condition is eventually detected, the existing flows on that path are re-routed to an alternate path, thereby increasing the chances of SLA violation on the new path as well as the existing application flows on that path. This is done without considering the impact of routing new flows to SLA compliant paths as well as moving the existing flows to alternate paths. Thus, application aware routing techniques in SD-WAN (e.g., SD-WAN Application Aware Routing policies) are reactive in nature, and consider current path SLA as the only measure of quality, which results in longer detection times of SLA path violations, toggling of all application flows from one pathway to the next, and poor user experience. Further, existing techniques do not allow for a subset of application flows to be moved between pathways.

Accordingly, there is a need for an intelligent and proactive way to route application flows, while minimizing SLA pathway violations.

Additionally, when designing a SD-WAN network, the topology, allocated capacity per site per link, the QoS policies, AAR (Application Aware Routing) policies are all defined to optimize network operation and cost and ensure that the users are able to access the network and applications with a good quality of experience. At the outset, the network is usually designed by making approximations on the connectivity and throughput requirements at a site and ensuring they are fairly distributed amongst the applications and users for optimal performance and experience.

However, an enterprise, when planning capacity requirements for their SD-WAN network, cannot consider the impact or future repercussions of adding another application into the network at a later state without extensive testing. For instance, with time, they may need to evolve the network and add new applications or replace existing applications with others. Additionally, users of the enterprise may grow and be variably distributed across the globe. Thus, when addition of an application does occur, the enterprise can only make assumptions about the usage of the application, its chattiness, its impact on the quality of the links or the effect of the application on the overall network and the existing applications. This makes migration of applications in existing deployments are slow and have a huge scope of introducing problems that are found much later during production roll out. For instance, the application may require additional bandwidth at particular sites, resulting in the particular sites going down.

Accordingly, there is a need for an intelligent way to determine the impact of adding a new application to a new SD-WAN and/or an existing network and the impact the new application on existing applications and their quality of experience.

This disclosure describes systems and mechanisms for device(s) in a SD-WAN to monitor the bandwidth utilization and usage patterns of the application flows, intelligently determine and predict the impact of the potential movement of the application traffic to a path and the SLA requirements of a pathway, and proactively route the packets through the most optimal path. In some examples, the system may receive an application model associated with an application and one or more policies. The system may monitor, within the network, a first set of application flows associated with the application on a first link. The system may also identify, a second set of application flows associated with the application. Additionally, the system may determine, based at least in part on the application model and the monitoring, an impact of each application flow of the second set of applications flows on the first link and a plurality of other links. The system may route, based at least in part on determining the impact, a first portion of the second set of application flows to the first link and a second portion of the second set of application flows to a second link of the plurality of other links.

In some examples, the systems and mechanism(s) may receive one or more application models associated with one or more applications and one or more policies associated with the network. The system may receive one or more application models associated with one or more applications and one or more policies associated with the network. The system may also determine, based at least in part on the monitoring and the application models, that a violation of a policy of the one or more policies on a first link of the one or more links has either (i) occurred or (ii) is likely to occur within a period of time. The system may determine, based at least in part on the application model and the monitoring, a subset of the application flows to move from the first link to a second link. The system may route the subset of the application flows from the first link to the second link.

This disclosure also describes systems and mechanisms for intelligently determining an impact introducing an application will have on an existing and/or newly designed SD-WAN. In some examples, the system may receive, from first networks associated with a plurality of tenants, first telemetry data associated with the first networks and a plurality of first applications. The system may generate, based at least in part on the first telemetry data, an application model for an application of the plurality of first applications. The system may receive, from a second network associated with an enterprise user, second telemetry data associated with the second network and a plurality of second applications. The system may generate, based at least in part on the application model and the second telemetry data, an impact analysis associated with the second network. The system may output the impact analysis to a user device for display.

In some examples, the telemetry data may comprise one or more application characteristics. The application characteristics may comprise one or more of flow telemetry (e.g., an application identifier, flow count-how many flows is the application creating, bytes, octets, bandwidth requirements, a number of users that access the application, drops, event(s) associated with the drops, DSCP markings); interface data (e.g., bandwidth utilization, total octets, packet(s), maximum supported line rate, tail drops, etc.); link characteristics (e.g., internet service provider (ISP) name, purchased bandwidth or available maximum bandwidth, link type (e.g., MPLS, Internet, LTE, etc.), geographic region, etc.); quality of service (QOS) prioritization requirements (e.g., low latency queuing, bandwidth reservation, etc.); application quality metrics (e.g., application performance index, application telemetry, application feedback, etc.); and/or any other suitable data or characteristic.

In some examples, the system may receive the telemetry data from a plurality of applications associated with a single network. In some examples, the system may receive the telemetry data for a plurality of applications for multiple networks and/or multiple tenants (e.g., customers of a service provider, such as enterprise customer(s), organization(s), individual(s), or any other suitable tenant). Accordingly, the system may receive, collect, and monitor telemetry data for applications from network(s) with different policies, prioritizations, geographic locations, etc.

In some examples, the system comprises a management module. In some examples, the management module may correspond to Cisco's vManage feature. In some examples, the management module is configured to monitors all pathways in a network for SLA characteristics. For instance, the management module may be configured to monitor the telemetry data to determine current delay, packet loss, delay, jitter (e.g., variable delay), etc. for each pathway. Further, the management module may be configured to identify SLA characteristics associated each link (e.g., pathway) and/or SLA requirements associated with each application. In some examples, the management module is configured to define one or more policies associated with a network. For instance, the management module may be configured to define one or more AAR policies. In some examples, the management module may be configured to receive application model(s) from the analytics module. In some examples, the management module may be configured to send the policies and the application models to devices (e.g., edge devices, network devices, etc.) within the network.

In some examples, the system comprises an analytics module. In some examples, the analytics module may comprise an analytics engine. In some examples, the analytics module may correspond to Cisco's vAnalytics feature. In some examples, the analytics module is configured to collect the telemetry data and learn network patterns, traffic patterns, and application characteristics for a plurality of applications across a plurality of networks. For instance, the analytics module may utilize the telemetry data to learn the application characteristics of a particular application. In some examples, the analytics module may also utilize network data (e.g., topology, policy information, etc.) or any other suitable data.

In some examples, the analytics module may generate model(s) of application(s) based on the telemetry data. In some examples, the application model(s) may correspond to application behavior of the application as a whole and/or one or more flows. For instance, the application model(s) may provide output indicative of a particular application's behavior. For instance, the output may comprise one or more of application bandwidth requirement per user, traffic volume that the application generates per user, flow characteristics (e.g., bandwidth utilization requirements per flow per user, number of flows per user, flow density per user (e.g., whether a flow is bursty in nature, steady, etc.), volume of traffic per flow, volume of traffic per flow over time, etc.); network SLA requirements (e.g., network loss, latency, jitter) in which this application behaves most optimally; usage pattern and seasonality (e.g., such as a usage heatmap, periodicity of use across day, week, month, etc.); pattern of access (1-N, N-1, 1-1); prioritization requirements at which the application behaves most optimally, or any other suitable parameter and/or output.

In some examples, the analytics module may comprise one or more pre-trained models and/or pre-trained weighted models. In some examples, the artificial intelligence models are pre-trained using machine learning techniques. In some examples, the change window system may store machine-trained data models for use during operation. Machine learning techniques include, but are not limited to supervised learning algorithms (e.g., artificial neural networks, Bayesian statistics, support vector machines, decision trees, classifiers, k-nearest neighbor, etc.), regression models, unsupervised learning algorithms (e.g., artificial neural networks, association rule learning, hierarchical clustering, cluster analysis, etc.), semi-supervised learning algorithms, deep learning algorithms, etc.), statistical models, etc. As used herein, the terms "machine learning," "machine-trained," and their equivalents, may refer to a computing model that can be optimized to accurately recreate certain outputs based on certain inputs.

Machine learning techniques include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. As used herein, the terms "machine learning," "machine-trained," and their equivalents, may refer to a computing model that can be optimized to accurately recreate certain outputs based on certain inputs. In some examples, the machine learning models include deep learning models, such as convolutional neural networks (CNN), deep learning neural networks (DNN), and/or artificial intelligence models. The term "neural network," and its equivalents, may refer to a model with multiple hidden layers, wherein the model receives an input (e.g., a vector) and transforms the input by performing operations via the hidden layers. An individual hidden layer may include multiple "neurons," each of which may be disconnected from other neurons in the layer. An individual neuron within a particular layer may be connected to multiple (e.g., all) of the neurons in the previous layer. A neural network may further include at least one fully-connected layer that receives a feature map output by the hidden layers and transforms the feature map into the output of the neural network. In some examples, the neural network comprises a graph where each node of the graph represents a layer within the neural network. Each node may be connected as part of a chain (e.g., a concatenation of layers). In some examples, input may be received by a node within the graph, the input is computed by the node and gets passed to one or more additional nodes in the chain.

In some examples, the application models may be updated and/or re-trained in real-time. For instance, the system may update the application models based on real-time telemetry data received across networks and/or across tenants. Accordingly, the system may provide more accurate application modeling of behavior of an application in a plurality of different conditions, environments, locations, etc.

In some examples, the application model(s) may be sent to and/or stored by the edge device(s). In some examples, the application model(s) may be used to determine an impact of moving one or more of the application flows associated with an application to a new pathway. For instance, the edge device(s) may receive AAR policy(ies) and application model(s) from the controller. The edge device(s) may utilize the application model(s) to proactively monitor pathways for potential SLA violations that have not yet occurred. For instance, the edge device may determine, using the application model, that an SLA violation for a first pathway is likely to occur based on behavior of the application (e.g., application characteristics), usage trends of the application etc. In this example, the edge device may identify one or more application flows on the first pathway to move to a second pathway in order to preserve SLA compliance on the first pathway. The edge device may further identify an optimal pathway as the second pathway on which to move the one or more application flows. For instance, the edge device may determine the second pathway is an optimal pathway base d on based on a projected impact to SLA compliance and bandwidth utilization the one or more application flows will have on the second pathway. Where the edge device determines the second pathway will remain SLA compliant for a period of time when the one or more application flows are added, the second pathway may be determined to be the optimal pathway. In this example, the one or more application flows may be moved from the first pathway to the second pathway, thereby preventing the SLA violation from occurring.

In some examples, when an SLA violation on a pathway is identified, the system may use the application model associated with the application to determine an optimal pathway for one or more application flows of the application. For instance, the system may utilize the application model to determine a percentage of the application flows (e.g., by application, by bandwidth, by flow count, or by flow type) that should be moved to an alternate path to (1) ensure the SLA on the newer path is not impacted and (2) improving the SLA on the existing path, which could be happening due to over subscription. As described above, when re-routing application flows to alternate SLA compliant paths, the system may re-route only a selected few application flows are re-routed to bring back into compliance the existing path (e.g., return the existing path to compliance) and application flows on that path, while also minimizing the chances of SLA violation of the new path as well as re-routed application flows.

In some examples, when a new application flow is introduced, the edge device may utilize the application model associated with the application to determine pathway(s) on which to place the application flows. For instance, the system may identify application characteristics using the application model and determine a projected impact of the new application flow(s) on one or more pathways and bandwidth utilization of each of the pathways. As noted above, the system may determine whether adding one or more of the application flow(s) to a particular pathway will result in an SLA violation occurring on the particular pathway and whether the particular pathway is capable of supporting the one or more application flow(s) for an extended period of time (e.g., such that SLA violations will likely not occur in the future based on the application's characteristics). Accordingly, the system may proactively select pathways and distribute the one or more application flows of an application to the pathways in order to maintain SLA compliance within the network.

As noted above AAR may be utilized in SD-WANs, which allows a user to define values for SLA characteristics (e.g., loss, latency, jitter, etc.). AAR requires a system to probe available pathways to determine the SLA characteristics. Accordingly, AAR enables a system to monitor SLA characteristics for each pathway and enables an edge device to use the AAR policies to select an appropriate pathway based on the SLA requirements for a particular application. However, existing AAR techniques do not consider whether selecting a particular pathway will result in the SLA requirements of the application being violated or the particular pathway being overloaded (e.g., whether SLA requirements of a specific application being violated). SLA requirements for an application may comprise maximum delay on a link, packet loss tolerance, etc. Further, as noted above, AAR techniques move all application flows from a first link to a second, SLA compliant link when a SLA violation occurs.

Accordingly, in contrast to existing techniques, the system may utilize application models to intelligently determine bandwidth utilization, and usage patterns of the application flows, determine and predict the impact of the potential movement or addition of the application traffic to a path and its SLA requirements, and intelligently route and/or re-route the packets through the most optimal path. Further, in contrast to existing techniques, the system described herein may route and/or re-route subset(s) of application flow(s) to different pathways, such that each of the different pathways maintain SLA compliance. Further, by proactively routing and/or re-routing based on the projected impact, the techniques described herein minimize the occurrence of SLA violations and may prevent SLA violations from occurring on an old pathway, as well as the new pathway(s). Accordingly, the techniques improve user experience and network quality, by reducing oversubscription on pathways, and improving network connections, application quality, and application performance within the network.

In some examples, the application model(s) may be used to determine an impact of introducing an application to an existing network and/or a new network (e.g., such as when a SD-WAN is being designed). For instance, in some examples, the output of the application model(s) may identify an impact of adding that application on the target network based on usage patterns, flow density, bandwidth requirements and volume of traffic to determine the choke points in the network due to over utilization of link capacity, concurrent usage patterns resulting in higher than determined capacity, and the impact on existing applications and their quality of experience.

In some examples, the analytics module is configured to receive data from a target network. For instance, the analytics module may be configured to receive telemetry data associated with a target network. The analytics module may be configured to learn network characteristics associated with the target network. For instance, the analytics module may be configured to learn, based on the data, flow telemetry (users, application, flow count, bandwidth usage, octets); interface statistics (bandwidth utilization, total octets, bytes, max available bandwidth, link type); policy data (QOS, etc.); usage patterns per existing application; user input (count of users, sites where this would be deployed); and/or any other characteristics.

In some examples, the analytics module is configured to generate an impact analysis associated with the target network. For instance, the analytics module may apply an application model associated with a particular application to the target network to generate the impact analysis. In some examples, the impact analysis may comprise output associated with introducing the particular application to an existing network. For instance, the output(s) may comprise one or more of: site(s) that meet the bandwidth, SLA and prioritization requirements of the application; site(s) where the bandwidth, SLA and prioritization requirements of the application are not met (e.g., particular site(s) within the network where SLA, bandwidth etc. will fall short; times of day issues will arise; site(s) that can only support 100 users; etc.); choke point(s) in the network (e.g., links that will not have enough bandwidth to support the application); site(s) where additional bandwidth requirement needs to be purchased to support the application; identification of whether the network supports the application (e.g., such as ISP link KPIs like loss, latency, jitter, bandwidth meets SLA, etc.; can identify ISPs that can support the application and identify ISPs that cannot support the application); how the new application will impact quality of existing applications within the network (e.g., due to link over subscription, tail drops due to burst load, elephant flows, etc.); identify user impact for existing applications when the new application is introduced; identify if the existing QoS policies meet the prioritization requirements of the application; or any other suitable output.

In some examples, the output(s) may further comprise one or more recommendations associated with the application. For instance, when designing the network, the outputs may additionally or alternatively comprise recommended policy (ies), prioritizations, bandwidth requirements, etc. In some examples, the recommendations may comprise recommendations to add more bandwidth (at particular locations, etc.), change one or more policies, etc.).

In this way, the system may intelligently analyze a target network and determine the impact of adding that application on the network based on usage patterns, flow density, bandwidth requirements and volume of traffic. The system may not only identify the choke points in the network due to over utilization of link capacity, concurrent usage patterns resulting in higher than determined capacity, and the impact on existing applications and their quality of experience, but may also identify why the choke points (or other issues) will occur (e.g., more bandwidth required, ISP does not support the application, etc.). Accordingly, the techniques enable a user to accurately determine bandwidth requirements, etc. associated with a particular application and provides a user with a mechanism when designing the network to receive recommendations based on the models. The techniques also streamline the process of adding applications to a network, migrating to a new application, etc. by preventing outages and choke points within the network from occurring.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram of an environment in which a system 100A can proactively route application traffic based on modeled impact of application flows on pathway SLA. While the system 100A shows an example controller 112, it is understood that any of the components of the system may be implemented on any device in the network 102 and/or any cloud-based service provider.

In some examples, the system 100A may include a network 102 that includes edge device(s) 104. The network 102 may include one or more networks implemented by any viable communication technology, such as wired and/or wireless modalities and/or technologies. The network 102 may include any combination of Personal Area Networks (PANs), SDCI, Local Area Networks (LANs), Campus Area Networks (CANs), Metropolitan Area Networks (MANs), extranets, intranets, the Internet, short-range wireless communication networks (e.g., ZigBee, Bluetooth, etc.), Wide Area Networks (WANs)—both centralized and/or distributed, SD-WANs, SDNs—and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers.

The system 100A may comprise controller 112. In some examples, the controller 112 corresponds to a system that has complete visibility into the fabric of a given network. In some examples, the controller 112 may comprise a controller, one or more processors, memory etc. In some examples, the controller 112 may be integrated as part of one or more of Cisco's vAnalytics feature, Cisco's vManage feature, and/or included in a SDWAN architecture.

The controller 112 may comprise management module 114. In some examples, the management module may correspond to Cisco's vManage feature. In some examples, the management module is configured to monitors all pathways in a network for SLA characteristics (e.g., delay, loss, jitter, etc.). For instance, the management module may be configured to monitor the telemetry data to determine current delay, packet loss, delay, jitter (e.g., variable delay), etc. for each pathway. Further, the management module may be configured to identify SLA characteristics associated each link (e.g., pathway) and/or SLA requirements associated with each application. In some examples, the management module is configured to define one or more policies associated with a network. For instance, the management module may be configured to define one or more AAR policies. In some examples, the management module may be configured to receive application model(s) from the analytics module. In some examples, the management module may be configured to send the policies and the application modules to devices (e.g., edge devices, network devices, etc.) within the network.

The controller 112 may comprise analytics module 116. In some examples, the analytics module may comprise an analytics engine. In some examples, the analytics module may correspond to Cisco's vAnalytics feature. In some examples, the analytics module is configured to collect the telemetry data and learn network patterns, traffic patterns, and application characteristics for a plurality of applications across a plurality of networks. For instance, the analytics module may utilize the telemetry data to learn the application characteristics of a particular application. In some examples, the analytics module may also utilize network data (e.g., topology, policy information, etc.) or any other suitable data.

In some examples, the analytics module 116 may generate application model(s) of application(s) based on the telemetry data. In some examples, the application model(s) may correspond to application behavior of the application as a whole and/or one or more flows. For instance, the application model(s) may provide output indicative of a particular application's behavior. For instance, the output may comprise one or more of application bandwidth requirement per user, traffic volume that the application generates per user, flow characteristics (e.g., bandwidth utilization requirements per flow per user, number of flows per user, flow density per user (e.g., whether a flow is bursty in nature, steady, etc.), volume of traffic per flow, volume of traffic per flow over time, etc.); network SLA requirements (e.g., network loss, latency, jitter) in which this application behaves most optimally; usage pattern and seasonality (e.g., such as a usage heatmap, periodicity of use across day, week, month, etc.); pattern of access (1-N, N-1, 1-1); prioritization requirements at which the application behaves most optimally, or any other suitable parameter and/or output.

In some examples, the analytics module may comprise one or more pre-trained models and/or pre-trained weighted models. In some examples, the artificial intelligence models are pre-trained using machine learning techniques. In some examples, the change window system may store machine-trained data models for use during operation. Machine learning techniques include, but are not limited to supervised learning algorithms (e.g., artificial neural networks, Bayesian statistics, support vector machines, decision trees, classifiers, k-nearest neighbor, etc.), regression models, unsupervised learning algorithms (e.g., artificial neural networks, association rule learning, hierarchical clustering, cluster analysis, etc.), semi-supervised learning algorithms, deep learning algorithms, etc.), statistical models, etc.

The controller 112 may be configured to communicate with the one or more edge device(s) 104. For instance, the controller 112 may receive network data (e.g., network traffic load data, network client data, etc.) or other data (e.g., application load data, data associated with WLCs, APs, etc.) from the edge device(s) 104. The edge device(s) 104 may comprise routers, switches, access points, stations, radios, or any other network device. In some examples, the edge device(s) 104 may monitor application flow(s) within the network and may report information associated with the traffic flow(s) to the controller 112.

For instance, the controller 112 may be configured to send policy (ies) and application model(s) 120 to the edge device(s) 104A and 104N. In some examples, the policy (ies) comprise the AAR policy (ies), network polices, quality of service policies, prioritization policies, or any other policy. In some examples, the application model(s) are associated with one or more application(s).

In some examples, the controller 112 is configured to receive telemetry data 118 from the edge device(s) 104. For instance, edge device 104A may send telemetry data 118 associated with application(s) 110A at site(s) 108 to the controller 112. Edge device 104N may send telemetry data 118 associated with application(s) 110N at branch(es) 106 to the controller 112.

In some examples, the telemetry data 118 comprises data associated with one or more application characteristics. The application characteristics may comprise one or more of flow telemetry (e.g., an application identifier, flow count-how many flows is the application creating, bytes, octets, bandwidth requirements, a number of users that access the application, drops, event(s) associated with the drops, DSCP markings); interface data (e.g., bandwidth utilization, total octets, packet(s), maximum supported line rate, tail drops, etc.); link characteristics (e.g., internet service provider (ISP) name, purchased bandwidth or available maximum bandwidth, link type (e.g., MPLS, Internet, LTE, etc.), geographic region, etc.); quality of service (QOS) prioritization requirements (e.g., low latency queuing, bandwidth reservation, etc.); application quality metrics (e.g., application performance index, application telemetry, application feedback, etc.); and/or any other suitable data or characteristic.

In some examples, the system comprises branch(es) 106 and/or site(s) 108. In some examples, the branch(es) 106 and/or site(s) comprise one or more user(s), mobile device(s), and/or Internet of Things (IoT) device(s) located at one or more locations. In some examples, the branch(es) 106 and/or site(s) communicate via edge device(s) 104. In some examples, the edge device(s) 104 comprise one or more routers, access point(s), or any other network device. In some examples, the edge device(s) 104 may comprise an ingress and/or egress router. In some examples, the edge device(s) 104 may comprise a SDCI router and/or headend device. In some examples, the branch(es) 106 and/or site(s) 108 communicate with each other, the controller 112, or cloud providers (e.g., SaaS, Internet, IaaS, etc.) via the network(s) 102.

In some examples, the controller 112 may be configured to communicate with administrator device(s) 122. As illustrated, the administrator device(s) 122 may comprise an application 124. In some examples, the application 124 may correspond to an application provided by a service provider (e.g., such as Cisco) that enables an administrator of the network 102 to access the controller 112. For instance, the enterprise application 124 may correspond to Cisco's vAnalytics and/or Cisco's vManage feature.

At "1", the system may receive telemetry data. For instance, the system may receive telemetry data 118 from edge device(s) 104A and/or edge device(s) 104N. The telemetry data 118 may be associated with one or more application(s), such as application(s) 110A and/or 110N used by users of the network 102 to access service(s) of a service provider and/or third parties.

At "2", the system may generate policy (ies) and application model(s). For instance, the system may receive input from application 124 on administrator device(s) 122. The input may configure one or more policies. As noted above, the policies may comprise AAR policies for the network that specify loss, latency, and jitter values. The system may generate the application model(s) using the telemetry data 118 and/or analytics module 116. As noted above, the application model(s) may correspond to application behavior of the application as a whole and/or one or more flows. For instance, the application model(s) may provide output indicative of a particular application's behavior. For instance, the output may comprise one or more of application bandwidth requirement per user, traffic volume that the application generates per user, flow characteristics (e.g., bandwidth utilization requirements per flow per user, number of flows per user, flow density per user (e.g., whether a flow is bursty in nature, steady, etc.), volume of traffic per flow, volume of traffic per flow over time, etc.); network SLA requirements (e.g., network loss, latency, jitter) in which this application behaves most optimally; usage pattern and seasonality (e.g., such as a usage heatmap, periodicity of use across day, week, month, etc.); pattern of access (1-N, N-1, 1-1); prioritization requirements at which the application behaves most optimally, or any other suitable parameter and/or output.

At "3", the system may push the policy (ies) and application model(s) to the edge device(s). For instance, the controller 112 may send the policies and application model(s) 120 to the edge device(s) 104. In some examples, the management module 114 is configured to send the policies and application model(s) to the edge device(s) 104.

At "4", the system may enforce the policy (ies) when routing application flow(s) using the application model(s). For instance, the edge device(s) 104 may store the policies and the application model(s).

In some examples, the system may use the application model(s) to determine an impact of moving one or more application flows associated with an application to a new pathway. For instance, the edge device(s) 104 may receive AAR policy (ies) and application model(s) from the controller 112. The edge device(s) may utilize the application model(s) to proactively monitor pathways for potential SLA violations that have not yet occurred. For instance, the edge device may determine, using the application model, that an SLA violation for a first pathway is likely to occur based on behavior of the application (e.g., application characteristics), usage trends of the application etc. In this example, the edge device may identify one or more application flows on the first pathway to move to a second pathway in order to preserve SLA compliance on the first pathway. The edge device may further identify an optimal pathway as the second pathway on which to move the one or more application flows. For instance, the edge device may determine the second pathway is an optimal pathway base d on based on a projected impact to SLA compliance and bandwidth utilization the one or more application flows will have on the second pathway. Where the edge device determines the second pathway will remain SLA compliant for a period of time when the one or more application flows are added, the second pathway may be determined to be the optimal pathway. In this example, the one or more application flows may be moved from the first pathway to the second pathway, thereby preventing the SLA violation from occurring.

In some examples, when an SLA violation on a pathway is identified, the system may use the application model associated with the application to determine an optimal pathway for one or more application flows of the application. For instance, the system may utilize the application model to determine a percentage of the application flows (e.g., by application, by bandwidth, by flow count, or by flow type) that should be moved to an alternate path to (1) ensure the SLA on the newer path is not impacted and (2) improving the SLA on the existing path, which could be happening due to over subscription. As described above, when re-routing application flows to alternate SLA compliant paths, the system may re-route only a selected few application flows are re-routed to bring back into compliance the existing-path and application flows on that path, while also minimizing the chances of SLA violation of the new path as well as re-routed application flows.

As an example, the system may identify a first link as having SLA requirements that have been violated. In this example, the system may determine, using the application model, flow characteristics associated with the application and each application flow of the application (e.g., such as 10 application flows). For instance, a single application flow of the 10 application flows may require 10 mbps of bandwidth and, over time, the application may grow steadily at a rate of 1% volume. The system may determine that moving three of the application flows will bring the first link back into compliance with the SLA requirements. Additionally, the system may identify a second link that can handle the three of the application flows, such that SLA requirements of the second link and the application are not violated if the three application flows are added. The system may further determine that the second link will be able to continue handling the three application flows as the application grows over time. The system may then move the three application flows for the particular application from the first link to the second link, while the remaining seven application flows remain on the first link.

In some examples, when a new application flow is introduced, the edge device may utilize the application model associated with the application to determine pathway(s) on which to place the application flows. For instance, the system may identify application characteristics using the application model and determine a projected impact of the new application flow(s) on one or more pathways and bandwidth utilization of each of the pathways. As noted above, the system may determine whether adding one or more of the application flow(s) to a particular pathway will result in an SLA violation occurring on the particular pathway and whether the particular pathway is capable of supporting the one or more application flow(s) for an extended period of time (e.g., such that SLA violations will likely not occur in the future based on the application's characteristics). Accordingly, the system may proactively select pathways and distribute the one or more application flows of an application to the pathways in order to maintain SLA compliance within the network.

As an example, when a user may open an application at a particular site, the system may receive an application flow associated with the application. The system may access the policies associated with the application and identify a first link as meeting the SLA requirements of the application. For instance, the system may know that the application performs well within a particular SLA range and the first link may fall within the SLA range. In this example, the system may determine that the first link is almost at capacity. Further, based on the application model of the application, the system may know that after 15 mins of usage, the bandwidth requirements for the application flow may grow by X amount (e.g., 10 mbps, or any other suitable amount), the volume of data sent by the application grows by Y amount (e.g., such as 100 mb per hour, or any other suitable amount), whether the application flows are bursty in nature, the time of day the application has the most traffic usage, whether the growth in volume of data sent is steady, exponential, slow, etc. Accordingly, the system may determine that adding the application flow to the first link would result in oversubscription of the first link. In this example, the system may then identify a second link that also meets the SLA requirements, but has the bandwidth capacity to support the application flow of the application over time. Accordingly, the system may enable an edge device can select a link based on how the application will impact a link over time, such that SLA requirements are met long term (e.g., hours, days, weeks, etc.).

In this way, the system may the system may intelligently determine bandwidth utilization, and usage patterns of the application flows, determine and predict the impact of the potential movement or addition of the application traffic to a path and its SLA requirements, and intelligently route and/or re-route the packets through the most optimal path. Further, in contrast to existing techniques, the system described herein may route and/or re-route subset(s) of application flow(s) to different pathways, such that each of the different pathways maintain SLA compliance, as well as the application. Further, by proactively routing and/or re-routing based on the projected impact, the techniques described herein minimize the occurrence of SLA violations and prevent SLA violations from occurring on an old pathway, as well as the new pathway(s). Accordingly, the techniques improve user experience and network quality, by reducing oversubscription on pathways, and improving network connections, application quality, and application performance within the network.

FIG. 1B illustrates a system-architecture diagram of an environment in which a system 100B can intelligently determine the impact of introducing an application to a target SD-WAN. While the system 100B shows an example controller 112, it is understood that any of the components of the system may be implemented on any device in the system 100B and/or system 100A of FIG. 1A. In some examples, the techniques described in system 100B may be used independently of the techniques described in system 100A of FIG. 1A. In some examples, the techniques of system 100B may be used in addition to the techniques described in system 100A of FIG. 1A.

As illustrated in FIG. 1B, the system 100B comprises network(s) 102, controller 112, management module 114, analytics module 116, and telemetry data 118. The system 100B may also include target network 126. In some examples, target network 126 may correspond to an SD-WAN being designed by an enterprise user (e.g., organization, business, etc.). In some examples, target network 126 may correspond to an SD-WAN that already exists and is being utilized by the enterprise user. In some examples, the enterprise user may be a tenant (e.g., customer or user of the network(s) 102) of a service provider of network(s) 102. In some examples, the enterprise user and/or the target network 126 may be separate from network(s) 102.

The system 100B may comprise user device(s) 130. In some examples, user device(s) 130 may correspond to administrator device(s) 122. In some examples, user device(s) 130 may correspond to a computing device of an enterprise user. User device(s) 130 may comprise application 132. Application 132 may correspond to an application that enables the enterprise user to access service(s) of a service provider (e.g., such as Cisco) of network(s) 102.

As illustrated, the controller 112 may be configured to receive instructions 134 from user device(s) 130 and/or application 132. The instructions 134 may comprise a request to generate an impact analysis associated with an application and/or a target network 126. For instance, the request may be associated with generating an impact analysis for adding a new application to the target network 126. In some examples, the request is associated with adding an application to a SD-WAN network design.

As illustrated the controller 112 may be configured to receive second telemetry data 128 from the target network. For instance, in response to the instructions 134, the controller 112 may request access to the target network 126 in order to learn characteristics associated with the target network 126. The second telemetry data 128 may comprise data associated with one or more characteristics. For instance, the second telemetry data 128 may comprise flow telemetry (users, application, flow count, bandwidth usage, octets); interface statistics (bandwidth utilization, total octets, bytes, max available bandwidth, link type); policy data (QOS, etc.); usage patterns per existing application; user input (count of users, sites where the application would be deployed); geographic locations associated with sites; or any other relevant data.

The controller 112 may generate and output an impact analysis data 136 to the user device(s) 130. For instance, the controller 112 may generate the impact analysis data 136 using analytics module 116. For instance, the analytics module may apply an application model associated with a particular application to the target network to generate the impact analysis. In some examples, the impact analysis may comprise output associated with introducing the particular application to an existing network. For instance, the output(s) may comprise one or more of: site(s) that meet the bandwidth, SLA and prioritization requirements of the application; site(s) where the bandwidth, SLA and prioritization requirements of the application are not met (e.g., particular site(s) within the network where SLA, bandwidth etc. will fall short; times of day issues will arise; site(s) that can only support 100 users; etc.); choke point(s) in the network (e.g., links that will not have enough bandwidth to support the application); site(s) where additional bandwidth requirement needs to be purchased to support the application; identification of whether the network supports the application (e.g., such as ISP link KPIs like loss, latency, jitter, bandwidth meets SLA, etc.; can identify ISPs that can support the application and identify ISPs that cannot support the application); how the new application will impact quality of existing applications within the network (e.g., due to link over subscription, tail drops due to burst load, elephant flows, etc.); identify user impact for existing applications when the new application is introduced; identify if the existing QoS policies meet the prioritization requirements of the application; or any other suitable output.

In some examples, the output(s) may further comprise one or more recommendations associated with the application. For instance, when designing the network, the outputs may additionally or alternatively comprise recommended policy (ies), prioritizations, bandwidth requirements, etc. In some examples, the recommendations may comprise recommendations to add more bandwidth (at particular locations, etc.), change one or more policies, etc.).

At "1", the system may receive telemetry data for network(s) of tenant(s). For instance, the system may receive telemetry data 118 associated with applications from network(s) 102 for a plurality of tenants (e.g., customer(s), organization(s), enterprise user(s), etc.) across a plurality of geographic locations.

At "2", the system may generate model(s) of application(s) based on cross-tenant metrics. For instance, the system may generate application model(s) using analytics module 116 as described herein. As noted above, the application model(s) may be generated using telemetry data associated with each particular application from each tenant. As noted above, the system may update the application model(s) in real-time based on the telemetry data 118. For instance, the application model(s) may correspond to application behavior of the application as a whole and/or one or more flows. For instance, the application model(s) may provide output indicative of a particular application's behavior. For instance, the output may comprise one or more of application bandwidth requirement per user, traffic volume that the application generates per user, flow characteristics (e.g., bandwidth utilization requirements per flow per user, number of flows per user, flow density per user (e.g., whether a flow is bursty in nature, steady, etc.), volume of traffic per flow, volume of traffic per flow over time, etc.); network SLA requirements (e.g., network loss, latency, jitter) in which this application behaves most optimally; usage pattern and seasonality (e.g., such as a usage heatmap, periodicity of use across day, week, month, etc.); pattern of access (1-N, N-1, 1-1); prioritization requirements at which the application behaves most optimally, or any other suitable parameter and/or output.

At "3", the system may receive second telemetry data from a target network. For instance, the system may receive second telemetry data 128 associated with an existing target network and/or a target network that is being designed.

In some examples, the analytics module 116 may be configured to receive telemetry data associated with a target network. The analytics module may be configured to learn network characteristics associated with the target network. For instance, the analytics module may be configured to learn, based on the data, flow telemetry (users, application, flow count, bandwidth usage, octets); interface statistics (bandwidth utilization, total octets, bytes, max available bandwidth, link type); policy data (QOS, etc.); usage patterns per existing application; user input (count of users, sites where this would be deployed); and/or any other characteristics.

At "4", the system may generate and output an impact analysis for adding application(s) to the target network. For instance, the system may generate the impact analysis (e.g., impact analysis data 136) using analytics module 116, as described above.

In this way, the system may intelligently analyze a target network and determine the impact of adding that application on the network based on usage patterns, flow density, bandwidth requirements, and volume of traffic of the application. The system may not only identify the choke points in the network due to over utilization of link capacity, concurrent usage patterns resulting in higher than determined capacity, and the impact on existing applications and their quality of experience, but may also identify why the choke points (or other issues) will occur (e.g., more bandwidth required, ISP does not support the application, etc.). Accordingly, the techniques enable a user to accurately determine bandwidth requirements, etc. associated with a particular application and provides a user with a mechanism when designing the network to receive recommendations based on the models. The techniques also streamline the process of adding applications to a network, migrating to a new application, etc. by preventing outages and choke points within the network from occurring.

FIG. 2 illustrates a component diagram of an example controller described in FIGS. 1A and 1B. In some instances, the controller 112 may run on one or more computing devices in, or associated with, the network 102 (e.g., a single device or a system of devices), system 100A, and/or system 100B. In some instances, the controller 112 may be integrated as part of a cloud-based management solution (e.g., such as Cisco's vAnalytics feature and/or Cisco's vManage feature).

Generally, the controller 112 may include a programmable controller that manages some or all of the control plane activities of the network 102, and manages or monitors the network state using one or more centralized control models.

As illustrated, the controller 112 may include, or run on, one or more hardware processors 202 (processors), one or more devices, configured to execute one or more stored instructions. The processor(s) 202 may comprise one or more cores. Further, the controller 112 may include or be associated with (e.g., communicatively coupled to) one or more network interfaces 204 configured to provide communications with edge device(s) 104 and other devices, and/or other systems or devices in the network 102 and/or remote from the network 102. The network interfaces 204 may include devices configured to couple to personal area networks (PANs), wired and wireless local area networks (LANs), wired and wireless wide area networks (WANs), SDCI's, and so forth. For example, the network interfaces 204 may include devices compatible with any networking protocol.

The controller 112 may also include memory 206, such as computer-readable media, that stores various executable components (e.g., software-based components, firmware-based components, etc.). The memory 206 may generally store components to implement functionality described herein as being performed by the controller 112. The memory 206 may store one or more network service functions 208, such as a slicing manager, a topology manager to manage a topology of the network 102, a host tracker to track what network components are hosting which programs or software, a switch manager to manage switches of the network 102, a process manager, and/or any other type of function performed by the controller 112.

The controller 112 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the network 102 (configurable), and one or more APIs 214 for communicating with devices in the network 102 and causing various control plane functions to occur.

Further, the controller 112 may include management module 114. As described above, in some examples, management module 114 may correspond to Cisco's vManage feature. In some examples, the management module is configured to monitors all pathways in a network for SLA characteristics. For instance, the management module may be configured to monitor the telemetry data to determine current delay, packet loss, delay, jitter (e.g., variable delay), etc. for each pathway. Further, the management module may be configured to identify SLA characteristics associated each link (e.g., pathway) and/or SLA requirements associated with each application. In some examples, the management module is configured to define one or more policies associated with a network. For instance, the management module may be configured to define one or more AAR policies. In some examples, the management module may be configured to receive application model(s) from the analytics module. In some examples, the management module may be configured to send the policies and the application modules to devices (e.g., edge devices, network devices, etc.) within the network.

The controller 112 may include analytics module 116. As described above, the analytics module may comprise an analytics engine. In some examples, the analytics module may correspond to Cisco's vAnalytics feature. In some examples, the analytics module is configured to collect the telemetry data and learn network patterns, traffic patterns, and application characteristics for a plurality of applications across a plurality of networks. For instance, the analytics module may utilize the telemetry data to learn the application characteristics of a particular application. In some examples, the analytics module may also utilize network data (e.g., topology, policy information, etc.) or any other suitable data.

In some examples, the analytics module may generate model(s) of application(s) based on the telemetry data. In some examples, the application model(s) may correspond to application behavior of the application as a whole and/or one or more flows. For instance, the application model(s) may provide output indicative of a particular application's behavior. For instance, the output may comprise one or more of application bandwidth requirement per user, traffic volume that the application generates per user, flow characteristics (e.g., bandwidth utilization requirements per flow per user, number of flows per user, flow density per user (e.g., whether a flow is bursty in nature, steady, etc.), volume of traffic per flow, volume of traffic per flow over time, etc.); network SLA requirements (e.g., network loss, latency, jitter) in which this application behaves most optimally; usage pattern and seasonality (e.g., such as a usage heatmap, periodicity of use across day, week, month, etc.); pattern of access (1-N, N-1, 1-1); prioritization requirements at which the application behaves most optimally, or any other suitable parameter and/or output.

In some examples, the application models may be updated and/or re-trained in real-time. For instance, the system may update the application models based on real-time telemetry data received across networks and/or across tenants. Accordingly, the system may provide more accurate application modeling of behavior of an application in a plurality of different conditions, environments, locations, etc.

The controller 112 may further include a data store 216, such as long-term storage, that stores communication libraries 218 for the different communication protocols that the controller 112 is configured to use or perform. Additionally, the data store 216 may include network topology data 220, such as a model representing the layout of the network components in the network 102 and/or data indicating available bandwidth, available CPU, delay between nodes, computing capacity, processor architecture, processor type(s), etc., The data store 216 may store policies 222 that includes AAR policies, security data associated with the network, security policies configured for the network, firewall policies, firewall configuration data, security posture data, and/or compliance policies configured for the network. The data store 216 may store data and models 224 that include telemetry data, network data, application model(s), impact analysis data, and/or any other data described herein.

Figure 3:
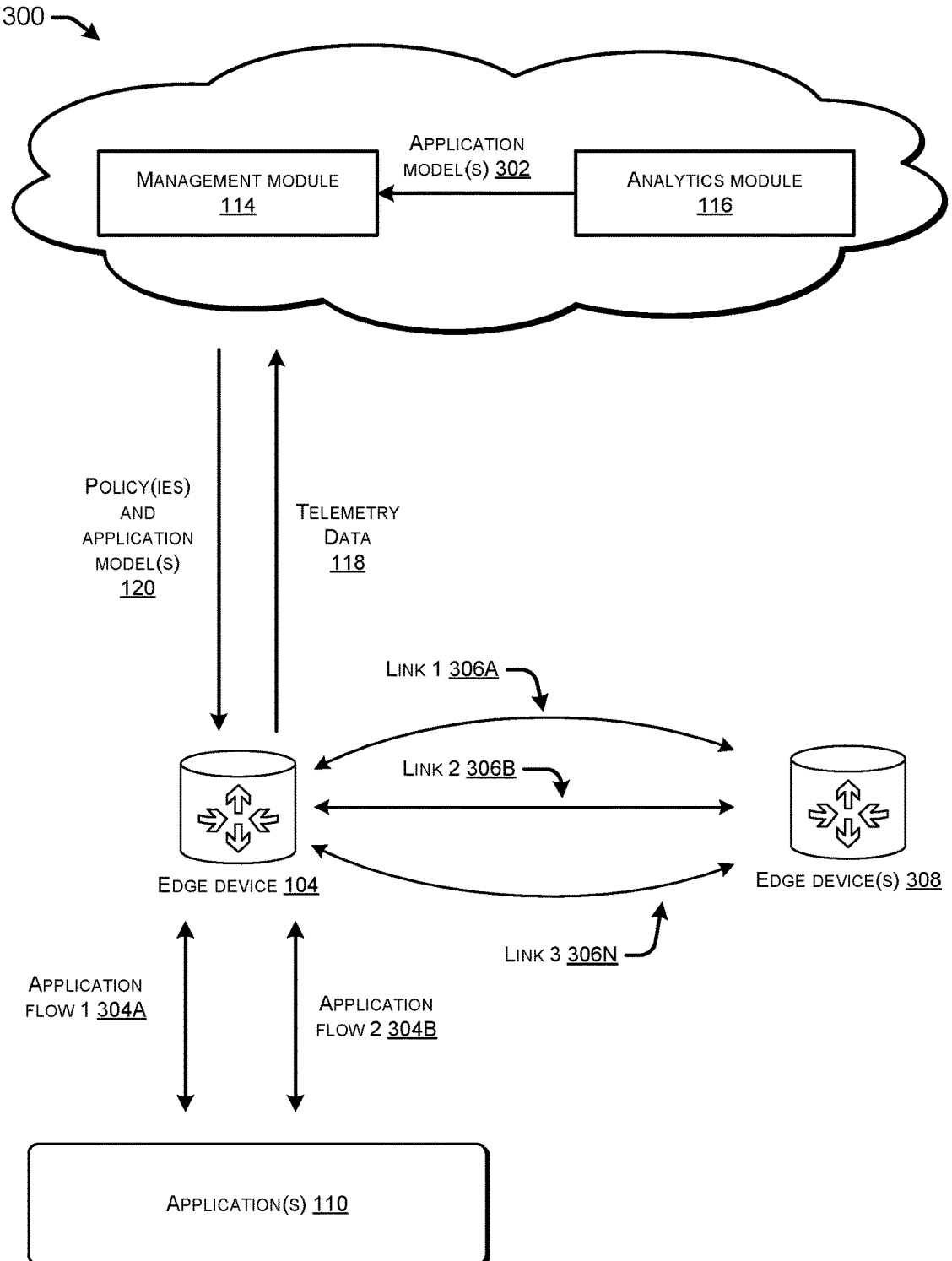
FIG. 3 an example environment and inputs and outputs between the components described in FIGS. 1-2.

FIG. 3 illustrates an example environment 300 showing exemplary inputs and outputs between the components described in FIGS. 1-2. In some examples, the environment 300 may be associated with system 100A described in FIG. 1A herein.

As illustrated, the environment 300 may include management module 114, analytics module 116, edge device(s) 104 and application(s) 110, as described in FIG. 1A. In some examples, the management module 114 and the analytics module 116 may be implemented as part of a cloud-based service. In some examples, one or more of the management module 114 and/or the analytics module 116 may be implemented by one or more devices (e.g., network devices, edge device(s), controller(s), etc.).

In the illustrated environment 300, edge device(s) 104 may be configured to send telemetry data 118 to the management module 114 and/or the analytics module 116. As noted above, the telemetry data 118 may be associated with a plurality of applications across a plurality of users within network 102. In the illustrated environment 300, the telemetry data 118 may be associated with application 110. Application(s) 110 may correspond to an application(s) being executed on a user device within network 102. In some examples, application(s) 110 may send one or more application flow(s) to edge device 104. As illustrated, application(s) 110 may be connected to edge device 104 and/or network 102 via one or more link(s) (e.g., pathways). In some examples, the one or more application flow(s) may be associated with the same application. In some examples, the one or more application flows may be associated with different applications. For example, an application may be connected to network 102 and may send application flow 1 304A via link 1 306A. The application may also send application flow 2 304B via link 2 306B. The application may send application flow 3 304N via link 3 306N.

The management module 114 may be configured to define one or more application aware routing (AAR) policies. For instance, the management module 114 may receive input from administrator device(s) 122 (not shown), defining value(s) for loss, latency, and jitter.

As illustrated, the analytics module 116 may be configured to generate application model(s). For instance, the analytics module 116 may generate application model(s) that model application bandwidth usage, pathway SLA compliance, and impact of application flow(s) on pathway SLA requirements. As noted above, the analytics module 116 may generate the application model(s) 302 based on the telemetry data 118. In some examples, the analytics module 116 may generate application model(s) 302 for each application of the application(s) 110. As illustrated, the analytics module 116 may send the application model(s) 302 to the management module 114.

In the illustrated environment 300, the management module 114 may be configured to send and/or push the policy (ies) and application model(s) 120 to edge device 104. In some examples, the edge device 104 may be configured to receive and store the policy (ies) and application model(s) 120. In some examples, the edge device 104 may use the policy (ies) and application model(s) 120 to enforce application aware routing with modelled data, in order to minimize SLA pathway violations. As illustrated in FIG. 3, the edge device 104 may be configured to monitor one or more links (e.g., link 1 306A, link 2 306B, . . . , link 3 306N) that connect to one or more edge device(s) 308. For instance, edge device(s) 308 may correspond to other edge devices (e.g., edge device(s) 104N) within the network 102. While not illustrated in FIG. 3, it is understood that edge device(s) 308 may be configured in a similar manner to edge device 104. For instance, edge device(s) 308 may be configured to send telemetry data 118 to controller 112 and/or receive and apply policy (ies) and application model(s) 120.

For instance, the edge device 104 may monitor link 1 306A, link 2 306B, . . . , link 3 306N, etc. that connect to other edge device(s) 308 within the network. For instance, edge device 104 may send application flow 1 to edge device 308 via link 1 306A. Edge device 104 may send application flow 2 304B via link 2 306B. In some examples, the edge device 104 may proactively and preventatively route application flows to prevent SLA pathway violations from occurring and/or when a new application flow is introduced. The edge device 104 may utilize an application model associated with an application to determine link(s) on which to place the application flows. For instance, the edge device 104 may identify application characteristics and application flow characteristics using the application model and determine a projected impact of the new application flow(s) on one or more pathways and bandwidth utilization of each of the pathways. The edge device 104 may determine whether adding one or more of the application flow(s) to a particular link will result in an SLA violation occurring on the particular link and whether the particular link is capable of supporting the one or more application flow(s) for an extended period of time (e.g., such that SLA violations will likely not occur in the future based on the application's characteristics). Accordingly, the edge device 104 may proactively select link(s) (e.g., pathways) and distribute the one or more application flows of an application to the links in order to maintain SLA compliance within the network.

As an example, when a user may open one of application(s) 110 and the edge device 104 may receive application flow 2 304B associated with the application. The edge device 104 may access the policies associated with the application and identify a first link (e.g., such as link 1 306A) connected to edge device 308 as meeting the SLA requirements of the application. For instance, the edge device 104 may determine, based on the application model, that the application performs well within a particular SLA range and link 1 306A may fall within the SLA range. In this example, the edge device 104 may determine that link 1 306A is almost at capacity. Further, based on the application model of the application, the edge device 104 may know that after 5 mins of usage, the bandwidth requirements for application flow 2 304B may grow by X amount (e.g., 10 mbps, or any other suitable amount), the volume of data sent by the application grows by Y amount (e.g., such as 100 mb per hour, or any other suitable amount), whether the application flows are bursty in nature, the time of day the application has the most traffic usage, whether the growth in volume of data sent is steady, exponential, slow, etc. Accordingly, the edge device 104 may determine that adding application flow 2 304B to the link 1 306A would result in oversubscription of link 1 306A. In this example, the edge device 104 may then identify link 2 306B as also meeting the SLA requirements of the application. The edge device 104 may determine that link 2 306B has the bandwidth capacity to support the behavior of application flow 2 304B over time. Accordingly, the edge device 104 can select link 2 306B and route application flow 2 304B to edge device 308 via link 2 306B, such that SLA requirements are met long term (e.g., hours, days, weeks, etc.), thereby preventing SLA violations from occurring.

In some examples, the edge device 104 may determine an SLA violation of a link has occurred. For instance, the system may utilize an application model associated with an application sending application flow(s) via the link to determine a percentage of the application flows (e.g., by application, by bandwidth, by flow count, or by flow type) that should be moved to an alternate path to (1) ensure the SLA on the newer path is not impacted and (2) improving the SLA on the existing path, which could be happening due to over subscription. As described above, when re-routing application flows to alternate SLA compliant paths, the system may re-route only a selected few application flows are re-routed to bring back into compliance the existing-path and application flows on that path, while also minimizing the chances of SLA violation of the new path as well as re-routed application flows.

For instance, the edge device 104 may determine that the SLA requirements of link 1 306A have been violated. In this example, edge device 104 may determine, using an application model associated with an application sending application flow 1 304A, flow characteristics associated with the application and each application flow of application flow 1 304A. For instance, application flow 1 304A may comprise 10 application flows (or any number of application flows) that are routed to edge device 308 via link 1 306A. In this example, the edge device 104 may determine, based on the application model, that each application flow of application flow 1 304A requires 10 mbps of bandwidth and, over time, the application may grow steadily at a rate of 1% volume. The edge device 104 may also determine that moving a subset of application flows of application flow 1 304A will bring the link 1 306A back into compliance with the SLA requirements of the pathway. Edge device 104 may identify one or more other links, such as link 2 306B, link 3 306N, etc., that meet the SLA requirements of the application associated with application flow 1 304A. For instance, the edge device 104 may determine that both link 2 306B and link 3 306N meet the SLA requirements. The edge device 104 may then determine whether the impact of adding the subset of application flows of application flow 1 304A to link 2 306B would result in oversubscription of link 2 306B. The edge device 104 may determine whether the impact of adding the subset of application flows of application flow 1 304A to link 3 306N would result in oversubscription of link 3 306N. For instance, the edge device 104 may determine that link 2 306B is almost at capacity, such that adding the subset of application flows would result in oversubscription within a period of time (e.g., 5 minutes, 10 minutes, 20 minutes, or any other suitable period of time). The edge device 104 may also determine that link 3 306N has the bandwidth capacity to handle the subset of application flows over a period of time (e.g., hour(s), day(s), etc.) based on the flow characteristics and the application behavior. Accordingly, the edge device 104 may select link 3 306N as the optimal pathway to edge device 308, and may re-route the subset of application flows of application flow 1 304A from link 1 306A to link 3 306N. In some examples, the edge device 104 may re-route all of application flow 1 304A to link 3 306N.

In this way, the edge device(s) may utilize application models to intelligently determine bandwidth utilization, and usage patterns of the application flows, determine and predict the impact of the potential movement or addition of the application traffic to a path and its SLA requirements, and intelligently route and/or re-route the packets through the most optimal path. Further, in contrast to existing techniques, the edge devices may route and/or re-route subset(s)

of application flow(s) to different pathways, such that each of the different pathways maintain SLA compliance and the application(s) maintain quality and performance requirements. Further, by proactively routing and/or re-routing based on the projected impact, the techniques described herein minimize the occurrence of SLA violations and may prevent SLA violations from occurring on an old pathway, as well as the new pathway(s). Accordingly, the techniques improve user experience and network quality, by reducing oversubscription on pathways, and improving network connections, application quality, and application performance within the network.

Figure 4:
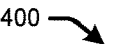
FIG. 4 illustrates an example environment and inputs and outputs between components described in FIGS. 1-3.

FIG. 4 illustrates an example environment 400 showing exemplary inputs and outputs between the components described in FIGS. 1-2. In some examples, the environment 400 may be associated with system 100B described in FIG. 1B herein.

As illustrated, the environment 400 may include management module 114, analytics module 116, edge device(s) 104, and target network 126, as described in FIGS. 1A and 1B. As noted above, edge device(s) 104 may be implemented as part of network(s) 102, such as a plurality of SD-WANs. In some examples, the management module 114 and the analytics module 116 may be implemented as part of a cloud-based service of the network(s) 102. In some examples, one or more of the management module 114 and/or the analytics module 116 may be implemented by one or more devices (e.g., network devices, edge device(s), controller(s), etc.).

In the illustrated environment 400, management module 114 and analytics module 116 are configured to communicate. Further, management module 114 may be configured to define one or more policy (ies) 120. For instance, policy (ies) 120 may comprise application aware routing policies, quality of service policies, security policies, etc. The management module 114 may push the policy (ies) 120 to edge device(s) 104 within network(s) 102.

Edge device(s) 104 may be configured to enforce policy (ies) 120 and may send first data 402 to the management module 114 and/or the analytics module 116. In some examples, first data 402 comprises telemetry data 118 described herein. As noted above, the telemetry data 118 may be associated with a plurality of applications across a plurality of users within network 102. In some examples, the first data 402 comprises telemetry data 118 associated with a plurality of tenants of network(s) 102.

In the illustrated environment 400, the analytics module 116 may be configured to learn application characteristics associated with a plurality of applications across the plurality of tenants. For instance, the analytics module may learn the application characteristics based on the telemetry data 118 across tenants, such that the analytics module 116 may learn application behavior across a plurality of customers, across a plurality of deployments, across a plurality of geographic locations, etc. For instance, the analytics module 116 may be configured to learn application characteristics including, but not limited to, flow telemetry (users, application, flow count, bandwidth usage, octets); interface statistics (bandwidth utilization, total octets, bytes, max available bandwidth, link type); policy data (QOS, etc.); usage patterns per existing application; user input (count of users, sites where this would be deployed); and/or any other characteristics.

In the illustrated environment 400, the analytics module 116 may generate application model(s) associated with each application, based on the cross-tenant telemetry data. As noted above, the application model(s) may provide output specific and/or customized to each application. For instance, the output may include, but is not limited to, application bandwidth requirements per user, traffic volume that the application generates per user, flow characteristics (e.g., bandwidth utilization requirements per flow per user, number of flows per user, flow density per user (e.g., whether a flow is bursty in nature, steady, etc.), volume of traffic per flow, volume of traffic per flow over time, etc.); network SLA requirements (e.g., network loss, latency, jitter) in which the application behaves most optimally; usage pattern and seasonality (e.g., such as a usage heatmap, periodicity of use across day, week, month, etc.); pattern of access (1-N, N-1, 1-1); prioritization requirements at which the application behaves most optimally, or any other suitable parameter and/or output.

In some examples, the analytics module 116 may be configured to receive second data 404 from a target network 126. For instance, the analytics module 116 may receive instruction(s) 134 from user device(s) 130. As described in FIG. 1B, the instruction(s) 134 may comprise a request for an impact analysis associated with adding an application to an existing network and/or a new network (e.g., a network being designed). In some examples, the request may identify the target network 126 associated with a user of the user device 130 and/or an application the user of user device(s) 130 wishes to add. As noted above, the target network 126 may correspond to a network that is separate from and/or not included in network(s) 102. Accordingly, the analytics module 116 may receive second data 404 after gaining access to the target network 126.

In some examples, the second data 404 may comprise telemetry data, network data, and/or any other suitable associated with a target network. The analytics module 116 may learn network characteristics associated with the target network 126. For instance, the analytics module may use the second data 404 to learn, based on the data, flow telemetry (users, application, flow count, bandwidth usage, octets); interface statistics (bandwidth utilization, total octets, bytes, max available bandwidth, link type); policy data (QOS, etc.); usage patterns per existing application; user input (count of users, sites where this would be deployed); and/or any other characteristics.

In some examples, the analytics module 116 is configured to generate an impact analysis associated with the target network 126. For instance, the analytics module 116 may apply an application model associated with a particular application identified in instruction(s) 134 to the network characteristics of target network 126 in order to generate impact analysis data 136. In some examples, the impact analysis data 136 may comprise output associated with introducing the particular application to the target network 126.

For example, where the target network 126 is an existing network, the output(s) may comprise one or more of: site(s) that meet the bandwidth, SLA and prioritization requirements of the application; site(s) where the bandwidth, SLA and prioritization requirements of the application are not met (e.g., particular site(s) within the network where SLA, bandwidth etc. will fall short; times of day issues will arise; site(s) that limits support to support 100 users; etc.); choke point(s) in the network (e.g., links that will not have enough bandwidth to support the application); site(s) where additional bandwidth requirement needs to be purchased to support the application; identification of whether the network supports the application (e.g., such as ISP link KPIs like loss, latency, jitter, bandwidth meets SLA, etc.; can identify ISPs that can support the application and identify ISPs that cannot support the application); how the new application will impact quality of existing applications within the network (e.g., due to link over subscription, tail drops due to burst load, elephant flows, etc.); identify user impact for existing applications when the new application is introduced; identify if the existing QOS policies meet the prioritization requirements of the application; or any other suitable output.

In some examples, the output(s) may further comprise one or more recommendations associated with the application. For instance, where the target network 126 corresponds to a new network that is being designed, the output(s) may additionally or alternatively comprise recommended policy (ies), prioritizations, bandwidth requirements, etc. that are associated with the application and/or other features of the target network 126. For instance, the recommendations may comprise recommendations to add more bandwidth (at particular locations, etc.), change one or more quality of service policies, etc.

In the illustrated environment 400, the analytics module 116 may output the impact analysis data 136 to user device(s) 130 for display.

As an example, a user may want to introduce a new application to an existing SD-WAN network. In this example, the user may send a request to analytics module 116 and may provide the analytics module 116 with access to the existing SD-WAN. The user may receive impact analysis data 136. In this example, the impact analysis data may identify one or more applications within the existing SD-WAN that will be impacted by adding the new application. For instance, the existing applications may correspond to real-time applications (e.g., voice calls, video conferencing, etc.) that have worked well within the existing SD-WAN. The impact analysis data may indicate a problem associated with introducing the new application. For instance, the impact analysis data may indicate that the real-time applications will no longer work (e.g., cannot connect, poor quality of service, AAR policies not met, etc.) if the new application is introduced to the existing SD-WAN. Additionally, the impact analysis data may indicate why the real-time applications will no longer work (e.g., more bandwidth is required to support the real-time applications and the new application at one or more sites), as well as a recommended action (e.g., purchase X amount of addition bandwidth for identified site(s)) in order to prevent the problem from occurring.

In this way, the system may intelligently analyze a target network and determine the impact of adding that application on the network based on usage patterns, flow density, bandwidth requirements and volume of traffic. The system may not only identify the choke points in the network due to over utilization of link capacity, concurrent usage patterns resulting in higher than determined capacity, and the impact on existing applications and their quality of experience, but may also identify why the choke points (or other issues) will occur (e.g., more bandwidth required, ISP does not support the application, etc.). Accordingly, the techniques enable a user to accurately determine bandwidth requirements, etc. associated with a particular application and provides a user with a mechanism when designing the network to receive recommendations based on the models. The techniques also streamline the process of adding applications to a network, migrating to a new application, etc. by preventing outages and choke points within the network from occurring.

Figure 5:
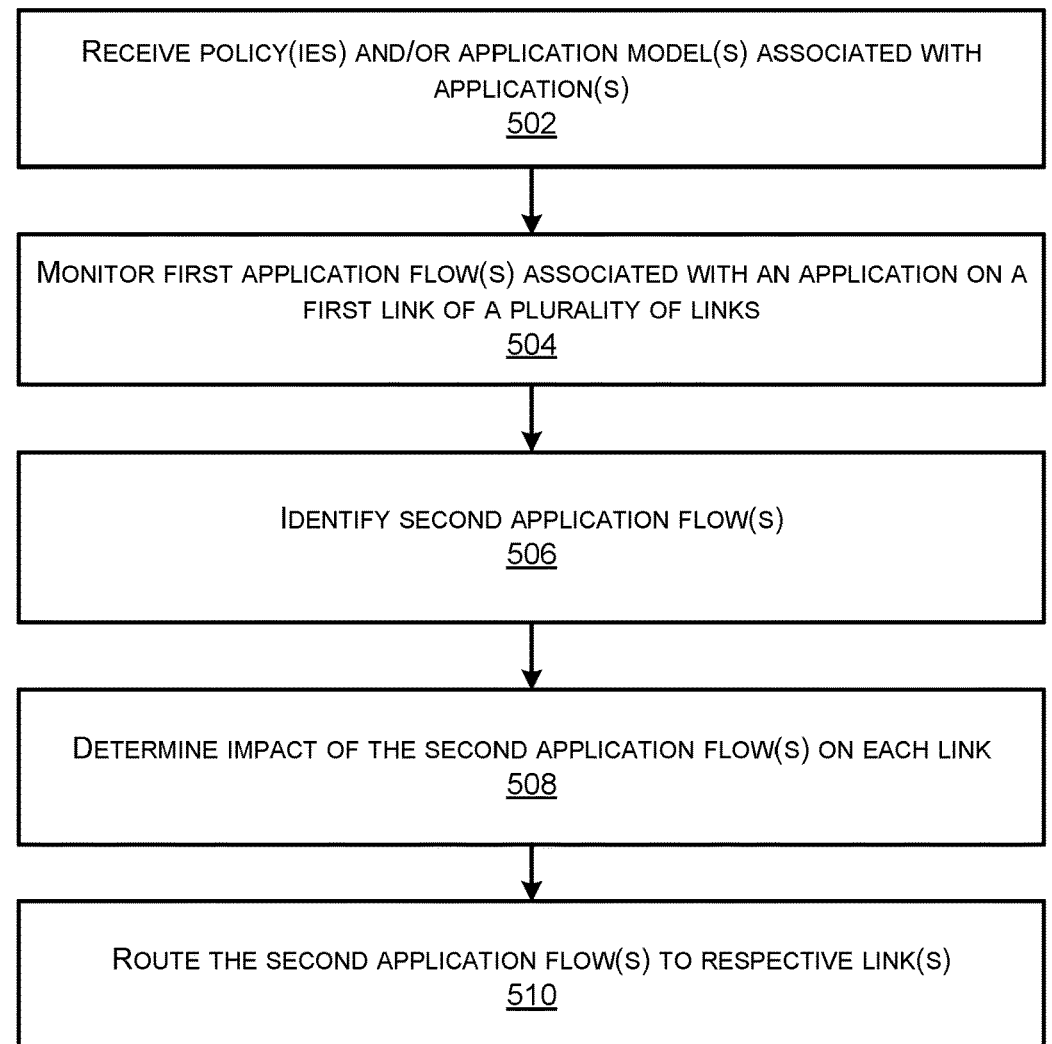
FIG. 5 illustrates a flow diagram of an example system for proactively routing application traffic to minimize SLA violations within a network associated with the system described in FIGS. 1-4.

FIG. 5 illustrates a flow diagram of an example system 500 for proactively routing application traffic to minimize SLA violations within a network, in accordance with the techniques described in FIGS. 1-4. In some instances, one or more of the steps of system 500 may be performed by one or more devices (e.g., controller 112, edge device(s) 104, etc.) that include one or more processors and one or more non-transitory computer-readable media storing computer-executable instructions that, when executed by the one or more processors, cause the one or more processors to perform operations of system 500. In some examples, the system 500 may be performed by an edge device 104 within a SD-WAN.

At 502, the system may receive policy (ies) and/or application model(s) associated with application(s). In some examples, the policy (ies) may comprise one or more routing policies (e.g., such as AAR policies), quality of service policies, prioritization policies, or any other policy that may be defined and/or configured for a network. In some examples, the system may receive the policy (ies) and/or application model(s) from a controller of the SD-WAN, such as controller 112, and/or a management module 114. As described herein, the application model(s) may be generated by an analytics engine (e.g., such as analytics module 116) based at least in part on telemetry data associated with the application(s) and received from a plurality of tenants across a plurality of networks. In some examples, the application model(s) may output application behavior data comprising bandwidth usage, SLA compliance per pathway, impact of an application flow over time, seasonal traffic pattern data (e.g., time(s) of day traffic on a particular link peaks, time(s) of day the particular link is unsuitable, time(s) of day the particular link is underutilized, time(s) of day application usage is highest, etc.), and peak load data (e.g., peak load(s) in interfaces on pathways for a particular application or across application(s) 110), and/or any other output(s) described herein.

In some examples, and as described above the application model(s) may be updated in real-time. For instance, the system may receive receiving, by the analytics engine, additional telemetry data associated with the application; and update, in real-time and based on the additional telemetry data, the application model. In some examples, the system may receive, from a controller (e.g., via push and/or sending via the network) the updated application model(s).

At 504, the system may monitor application flow(s) associated with the application(s) on a plurality of links. For instance, the system may monitor the application flow(s) based on the policy (ies). The system may determine flow characteristics associated with each application flow and/or each link.

In some examples, the system may detect, based at least in part on monitoring the first link and the second link, that an SLA violation associated with the first link has occurred. The system may determine, based at least in part on the application model, an impact of each application flow of the first set of applications flows on the plurality of other links. The system may identify a third link as an optimal link for one or more application flows of the first set of application flows. The system may route the one or more application flows of the first set of application flows to the third link.

At 506, the system may identify second application flow(s). For instance, the system may identify second application flow(s) associated with an application of the plurality of application(s). In some examples, the second application flow(s) may be associated with a new application flow, such as when a user opens an application on a user device.

At 508, the system may determine an impact the second application flow(s) on each link. For instance, the system may determine an impact of each application flow of the second application flow(s) on each link. In some examples, the system may determine, based at least in part on determining the impact, that the first link is a first optimal link for a first portion (e.g., a subset, a percentage, etc.) of the second set of application flows and the second link of the plurality of other links is a second optimal link for the second portion of the second set of application flows.

At 510, the system may route the second application flow(s) to respective link(s). For instance, the system may route all of the second application flow(s) to a single link. In other examples, the system may route a first subset of the second application flow(s) to a first link and a second subset of the second application flow(s) to a second link.

In some examples, the system may determine, based at least in part on monitoring the first set of application flows, that an SLA violation is likely to occur within a period of time. In this example, the system may determine, based at least in part on the application model and SLA policies associated with the application, a subset of the first set of application flows to move to a third link. The system may route the subset of the first set of application flows from the first link to the third link, wherein the third link is identified as an optimal link for the subset of the first set of application flows.

In some examples, the system may determine that the third link is the optimal link is based at least in part on: determining that the third link meets SLA requirements associated with the application; and determining that the third link will continue to meet the SLA requirements over time based on behavior characteristics of the application and the application flows, the behavior characteristics being output by the application model.

FIG. 6 illustrates a flow diagram of an example system 600 for proactively routing application traffic to minimize SLA violations within a network, in accordance with the techniques described in FIGS. 1-5. In some instances, the steps of system 600 may be performed by one or more devices (e.g., controller 112, edge device(s) 104, etc.) that include one or more processors and one or more non-transitory computer-readable media storing computer-executable instructions that, when executed by the one or more processors, cause the one or more processors to perform operations of system 600.

At 602, the system may receive policy (ies) and/or application model(s) associated with application(s). In some examples, the policy (ies) may comprise one or more routing policies (e.g., such as AAR policies), quality of service policies, prioritization policies, or any other policy that may be defined and/or configured for a network. In some examples, the system may receive the policy (ies) and/or application model(s) from a controller of the SD-WAN, such as controller 112, and/or a management module 114. As described herein, the application model(s) may be generated by an analytics engine (e.g., such as analytics module 116) based at least in part on telemetry data associated with the application(s) and received from a plurality of tenants across a plurality of networks. In some examples, the application model(s) may output application behavior data comprising bandwidth usage, SLA compliance per pathway, impact of an application flow over time, seasonal traffic pattern data (e.g., time(s) of day traffic on a particular link peaks, time(s) of day the particular link is unsuitable, time(s) of day the particular link is underutilized, time(s) of day application usage is highest, etc.), and peak load data (e.g., peak load(s) in interfaces on pathways for a particular application or across application(s) 110), and/or any other output(s) described herein.

In some examples, and as described above the application model(s) may be updated in real-time. For instance, the system may receive receiving, by the analytics engine, additional telemetry data associated with the application; and update, in real-time and based on the additional telemetry data, the application model. In some examples, the system may receive, from a controller (e.g., via push and/or sending via the network) the updated application model(s).

At 604, the system may monitor application flow(s) associated with the application(s) on a plurality of links. For instance, the system may monitor the application flow(s) based on the policy (ies). The system may determine flow characteristics associated with each application flow and/or each link.

At 606, the system may determine that a violation of a policy has occurred or is likely to occur within a period of time for a first link. For instance, the system may determine, based on monitoring the link(s) and the application model(s) that an SLA pathway violation has occurred on a first link.

In some examples, the system may determine, based on the application model(s) and monitoring the link(s), that a SLA pathway violation for the first link is likely to occur within a period of time (e.g., 5 minutes, 10 minutes, 15 minutes, etc.). As an example, the system may determine, based on an application model, that a particular application grows by 5 users every hour and each user's application flow requires 10 mbps of bandwidth. The system may further identify that peak load of the network and/or link is occurring within the next hour, such that a link will not be able to support adding 5 new application flows, which would result in oversubscription of the link and an SLA pathway violation.

In some examples, the second application flow(s) may correspond to existing application flow(s) that are being monitored. For instance, the second application flow(s) may correspond to application flow(s) on links where an SLA pathway violation is likely to occur within a period of time.

At 608, the system may determine a subset of application flows to move from the first link to a second link. For instance, the system may determine that moving a subset of first application flow(s) from the first link would either (1) bring the first link back within SLA pathway compliance; or (2) prevent the SLA violation from occurring and enabling the first link to maintain SLA pathway compliance. The system may further identify a second link as an optimal link, using the techniques described above.

At 610, the system may route the subset of application flow(s) to the second link. In some examples, such as where the second application flow(s) are operating on a first link, the system may re-route a subset of the second application flow(s) from the first link to a second link, such that a portion of the second application flow(s) remain on the first link.

FIG. 7 illustrates a flow diagram of an example system 700 for intelligently determining the impact of introducing an application to a target network, in accordance with the techniques described in FIGS. 1-6. In some instances, the steps of system 700 may be performed by one or more devices (e.g., controller 112, edge device(s) 104, etc.) that include one or more processors and one or more non-transitory computer-readable media storing computer-executable instructions that, when executed by the one or more processors, cause the one or more processors to perform operations of system 700. In some examples, the system 700 may be implemented by a central entity with visibility into a plurality of networks. For instance, the system may be implemented as one or more features of a service provider, such as Cisco's vManage feature, Cisco's vAnalytics feature, etc.

At 702, the system may receive first telemetry data associated with application(s) of first network(s). For instance, the first telemetry data may be associated with the first network(s) and the first application(s) across a plurality of tenants.

In some examples, the system may determine, based at least in part on the first telemetry data, application characteristics for the application, the application characteristics including flow telemetry data, interface statistic data, link characteristic data, quality of service prioritization data, application quality metrics.

At 704, the system may generate application model(s) for the application(s). For instance, the system may generate application model(s) for each of the application(s) based on the cross-tenant telemetry data (e.g., first telemetry data) and/or the application characteristics.

In some examples, each application model generates output data associated with the application, the output data including application bandwidth requirements per user, traffic volume generated by the application per user, SLA requirements within a network at which the application behaves optimally, traffic flow characteristics, usage pattern and seasonality characteristics, pattern of access, prioritization characteristics.

At 706, the system may receive second telemetry data associated with second application(s) of a second network. For instance, the second network may correspond to target network 126. In some examples, the second network is associated with an enterprise user. In some examples, the request may identify an application being added to the second network, the second network comprising an existing SD-WAN or a SD-WAN being designed.

In some examples, the system may access an application model for a particular application based at least in part on receiving a request from a device of an enterprise user, the request identifying the particular application as being added to the second network.

In some examples, the system may determine, based at least in part on the second telemetry data, network characteristics associated with the second network, the network characteristics including network topology data, flow telemetry data, interface statistic data, link characteristic data, policy data, usage patterns per existing application, and user data.

At 708, the system may generate an impact analysis associated with the second network for one or more of the first application(s). For instance, the impact analysis may be generated for the particular application identified by the request, where the particular application corresponds to an application of the first application(s).

In some examples, the impact analysis includes one or more outputs indicating one or more sites that meet one or more requirements of the application, one or more sites that fail to meet the one or more requirements of the application, one or more choke points within the second network, additional bandwidth requirements associated with one or more locations within the second network, one or more ISPs that support the application, one or more ISPs that do not support the application, an impact of the application on one or more second applications within the second network, one or more policies within the second network that are met, and one or more policies within the second network that are not met.

In some examples, the impact analysis comprises one or more recommendations associated with including the application in the second network, the recommendations corresponding to one or more network characteristics of the second network or one or more application characteristics.

In some examples, the impact analysis is further generated based at least in part on inputting the network characteristics to the application model.

At 710, the system may output the impact analysis for display. For instance, the system may send the impact analysis to the device of the enterprise user for display.

In some examples, the system may generate, based at least in part on the first telemetry data, one or more second application models for one or more second applications of the plurality of first applications. For instance, the system may receive a second request from the enterprise user requesting an impact analysis for adding one or more additional applications to the target network. The system may generate, based at least in part on the one or more second application models and the second telemetry data, one or more second impact analyses associated with the second network. The system may output the one or more second impact analyses to the user device for display.

Figure 8:
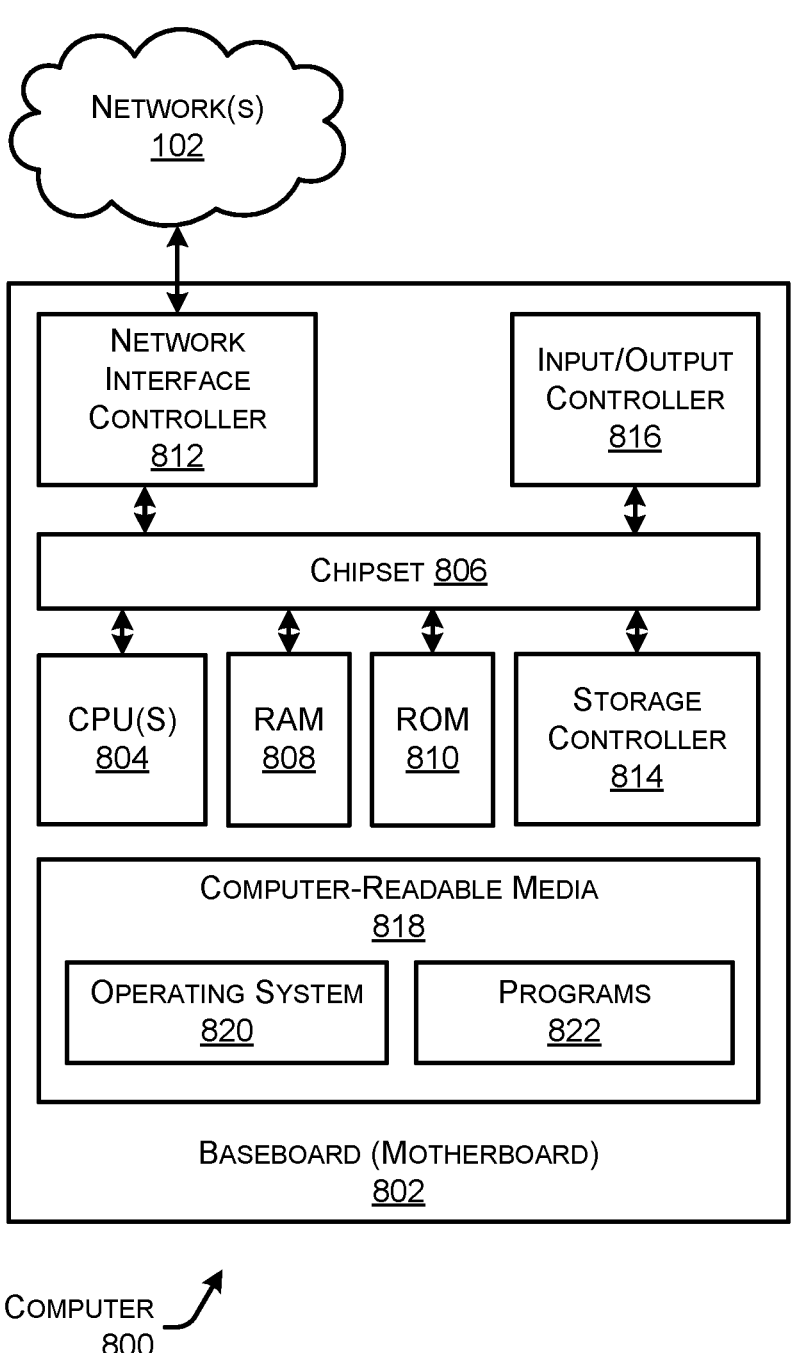
FIG. 8. is a computer architecture diagram showing an illustrative computer hardware architecture for implementing a device that can be utilized to implement aspects of the various technologies presented herein.

FIG. 8 shows an example computer architecture for a device capable of executing program components for implementing the functionality described above. The computer architecture shown in FIG. 8 illustrates any type of computer 800, such as a conventional server computer, workstation, desktop computer, laptop, tablet, network appliance, e-reader, smartphone, or other computing device, and can be utilized to execute any of the software components presented herein. The computer may, in some examples, correspond to a controller 112 and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM")

for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as network 102. The chipset 806 can include functionality for providing network connectivity through a NIC 812, such as a gigabit Ethernet adapter. The NIC 812 is capable of connecting the computer 800 to other computing devices over the network 102. It should be appreciated that multiple NICs 812 can be present in the computer 800, connecting the computer to other types of networks and remote computer systems.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the controller 112 and/or any components included therein, may be supported by one or more devices similar to computer 800. Stated otherwise, some or all of the operations performed by the controller 112 and/or any components included therein, may be performed by one or more computer devices.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-7. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

As described herein, the computer 800 may comprise one or more of a controller 112 and/or any other device. The computer 800 may include one or more hardware processors (processors, such as CPUs 804) configured to execute one or more stored instructions. The processor(s) may comprise one or more cores. Further, the computer 800 may include one or more network interfaces configured to provide communications between the computer 800 and other devices, such as the communications described herein as being performed by the controller 112 and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure. For instance, the programs 822 may cause the computer 800 to perform techniques including receiving an application model associated with an application and one or more policies; monitoring, within the network, a first set of application flows associated with the application on a first link; identifying, a second set of application flows associated with the application; determining, based at least in part on the application model and the monitoring, an impact of each application flow of the second set of applications flows on the first link and a plurality of other links; and routing, based at least in part on determining the impact, a first portion of the second set of application flows to the first link and a second portion of the second set of application flows to a second link of the plurality of other links.

The programs 822 may also cause the computer 800 to perform techniques including receiving one or more application models associated with one or more applications and one or more policies associated with the network; monitoring, based on the one or more policies and the one or more application models, application flows associated with the one or more applications on one or more links; determining, based at least in part on the monitoring and the application models, that a violation of a policy of the one or more policies on a first link of the one or more links has either (i) occurred or (ii) is likely to occur within a period of time; determining, based at least in part on the application model and the monitoring, a subset of the application flows to move from the first link to a second link; and routing the subset of the application flows from the first link to the second link.

In this way, the computer 800 can intelligently determine bandwidth utilization, and usage patterns of the application flows, determine and predict the impact of the potential movement or addition of the application traffic to a path and its SLA requirements, and intelligently route and/or re-route the packets through the most optimal path. Further, in contrast to existing techniques, the system described herein may route and/or re-route subset(s) of application flow(s) to different pathways, such that each of the different pathways maintain SLA compliance. Further, by proactively routing and/or re-routing based on the projected impact, the techniques described herein minimize the occurrence of SLA violations and may prevent SLA violations from occurring on an old pathway, as well as the new pathway(s). Accordingly, the techniques improve user experience and network quality, by reducing oversubscription on pathways, and improving network connections, application quality, and application performance within the network.

Additionally, the programs 822 may also cause the computer 800 to perform techniques including receiving from first networks associated with a plurality of tenants, first telemetry data associated with the first networks and a plurality of first applications; generating, based at least in part on the first telemetry data, an application model for an application of the plurality of first applications; receiving, from a second network associated with an enterprise user, second telemetry data associated with the second network and a plurality of second applications; generating, based at least in part on the application model and the second telemetry data, an impact analysis associated with the second network; and outputting the impact analysis to a user device for display.

In this way, the computer 800 can intelligently analyze a target network and determine the impact of adding that application on the network based on usage patterns, flow density, bandwidth requirements and volume of traffic. The system may not only identify the choke points in the network due to over utilization of link capacity, concurrent usage patterns resulting in higher than determined capacity, and the impact on existing applications and their quality of experience, but may also identify why the choke points (or other issues) will occur (e.g., more bandwidth required, ISP does not support the application, etc.). Accordingly, the techniques enable a user to accurately determine bandwidth requirements, etc. associated with a particular application and provides a user with a mechanism when designing the network to receive recommendations based on the models. The techniques also streamline the process of adding applications to a network, migrating to a new application, etc. by preventing outages and choke points within the network from occurring.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented by an edge device of a network, the method comprising:

receiving an application model associated with an application and one or more policies, the application model indicating historical behavior of the application that is affected by network resources allocated to historical application flows of the application;

monitoring, within the network, a current behavior of the application associated with a first set of application flows of the application on a first link of a plurality of links;

identifying a second set of application flows associated with the application;

predicting, based at least in part on the application model and the monitoring, an impact on the current behavior of the application that would be caused by routing each application flow of the second set of application flows on each of the plurality of links;

determining, based at least in part on the impact, that the first link and a second link of the plurality of links are optimized for the second set of application flows;

routing, based at least in part on the first link and the second link being optimized, a first portion of the second set of application flows to the first link and a second portion of the second set of application flows to a second link of the plurality of links.

2. The method of claim 1, wherein the application model is generated by an analytics engine based at least in part on telemetry data associated with the application and received from a plurality of tenants across a plurality of networks.

3. The method of claim 2, wherein the application model outputs application behavior data comprising bandwidth usage, SLA compliance per pathway, impact of an application flow over time, seasonal traffic pattern data, and peak load data.

4. The method of claim 2, further comprising:

receiving additional telemetry data associated with the application; and updating, in real-time and based on the additional telemetry data, the application model.

5. The method of claim 1, further comprising:

determining, based at least in part on monitoring the first set of application flows, that an SLA violation is to occur within a period of time;

determining, based at least in part on the application model and SLA policies associated with the application, a subset of the first set of application flows to move to a third link; and routing the subset of the first set of application flows from the first link to the third link, wherein the third link is identified as an optimal link for the subset of the first set of application flows.

6. The method of claim 5, wherein determining that the third link is the optimal link is based at least in part on:

determining that the third link meets SLA requirements associated with the application; and determining that the third link will continue to meet the SLA requirements over time based on behavior characteristics of the application and the application flows, the behavior characteristics being output by the application model.

7. The method of claim 1, further comprising:

determining, based at least in part on determining the impact, that the first link is a first optimal link for the first portion of the second set of application flows and the second link of the plurality of links is a second optimal link for the second portion of the second set of application flows.

8. The method of claim 1, further comprising:

detecting, based at least in part on monitoring the first link and the second link, that an SLA violation associated with the first link has occurred;

determining, based at least in part on the application model, an impact of each application flow of the first set of applications flows on the plurality of links;

identifying a third link as an optimal link for one or more application flows of the first set of application flows; and routing the one or more application flows of the first set of application flows to the third link.

9. The method of claim 1, wherein the one or more policies comprise one or more application aware routing policies, networking policies, quality of service policies, prioritization policies.

10. A system comprising:

one or more processors; and one or more non-statutory computer-readable media storing instructions that, when executed by the one or more processors, cause the one or more processors to perform operations comprising:

receiving an application model associated with an application and one or more policies associated with a network, the application model indicating historical behavior of the application that is affected by network resources allocated to historical application flows of the application;

monitoring, within the network, a current behavior of the application associated with a first set of application flows of the application on a first link of a plurality of links;

identifying a second set of application flows associated with the application;

predicting, based at least in part on the application model and the monitoring, an impact on the current behavior of the application that would be caused by routing each application flow of the second set of application flows on each of the plurality of links;

routing, based at least in part on determining the impact, a first portion of the second set of application flows to the first link and a second portion of the second set of application flows to a second link of the plurality of links.

11. The system of claim 10, wherein the application model is generated by an analytics engine based at least in part on telemetry data associated with the application and received from a plurality of tenants across a plurality of networks.

12. The system of claim 11, wherein the application model outputs application behavior data comprising bandwidth usage, SLA compliance per pathway, impact of an application flow over time, seasonal traffic pattern data, and peak load data.

13. The system of claim 11, the operations further comprising:

receiving additional telemetry data associated with the application; and updating, in real-time and based on the additional telemetry data, the application model.

14. The system of claim 10, the operations further comprising:

determining, based at least in part on monitoring the first set of application flows, that an SLA violation is to occur within a period of time;

determining, based at least in part on the application model and SLA policies associated with the application, a subset of the first set of application flows to move to a third link; and routing the subset of the first set of application flows from the first link to the third link, wherein the third link is identified as an optimal link for the subset of the first set of application flows.

15. The system of claim 14, wherein determining that the third link is the optimal link is based at least in part on:

determining that the third link meets SLA requirements associated with the application; and determining that the third link will continue to meet the SLA requirements over time based on behavior characteristics of the application and the application flows, the behavior characteristics being output by the application model.

16. The system of claim 10, the operations further comprising:

determining, based at least in part on determining the impact, that the first link is a first optimal link for the first portion of the second set of application flows and the second link of the plurality of links is a second optimal link for the second portion of the second set of application flows.

17. The system of claim 10, the operations further comprising:

detecting, based at least in part on monitoring the first link and the second link, that an SLA violation associated with the first link has occurred;

determining, based at least in part on the application model, an impact of each application flow of the first set of applications flows on the plurality of links;

identifying a third link as an optimal link for one or more application flows of the first set of application flows; and routing the one or more application flows of the first set of application flows to the third link.

18. The system of claim 10, wherein the one or more policies comprise one or more application aware routing policies, networking policies, quality of service policies, prioritization policies.

19. A method implemented by an edge device of a network, the method comprising:

receiving one or more application models associated with one or more applications and one or more policies associated with the network, the one or more application models indicating historical behavior of the one or more applications that is affected by network resources allocated to historical application flows of the one or more applications;

monitoring, based on the one or more policies and the one or more application models, application flows associated with the one or more applications on one or more links;

determining, based at least in part on the monitoring and the application models, that a violation of a policy of the one or more policies associated with a current behavior of the application caused by a first link of the one or more links has either (i) occurred or (ii) is to occur within a period of time;

determining, based at least in part on the application model and the monitoring, a subset of the application flows to move from the first link to a second link; and routing the subset of the application flows from the first link to the second link.

20. The method of claim 19, wherein routing the subset of the application flows causes either (i) the first link to maintain compliance with the policy and the second link to maintain compliance with the policy or (ii) the first link to return to compliance with the policy and the second link to maintain compliance with the policy.

* * * * *